(12) United States Patent
Fujimori et al.

(10) Patent No.: US 6,844,993 B2
(45) Date of Patent: Jan. 18, 2005

(54) OPTICAL DEVICE AND PROJECTOR HAVING THE OPTICAL DEVICE

(75) Inventors: Motoyuki Fujimori, Suwa (JP); Atsushi Miyazawa, Suwa (JP)

(73) Assignee: Seiko Epson Corporation, Tokyo (JP)

(*) Notice: Subject to any disclaimer, the term of this patent is extended or adjusted under 35 U.S.C. 154(b) by 15 days.

(21) Appl. No.: 10/463,593

(22) Filed: Jun. 18, 2003

(65) Prior Publication Data

US 2004/0032665 A1 Feb. 19, 2004

(30) Foreign Application Priority Data

Jun. 19, 2002 (JP) ........................................ 2002-178705

(51) Int. Cl.[7] .............................. G02B 7/02; G03B 21/16
(52) U.S. Cl. ............................ 359/820; 353/52; 353/54
(58) Field of Search ............................ 359/820; 353/52, 353/54, 57, 60, 61

(56) References Cited

U.S. PATENT DOCUMENTS 5,493,351 A * 2/1996 Hamagishi et al. ............ 353/84
6,607,277 B2 * 8/2003 Yokoyama et al. ............ 353/52
6,639,743 B2 * 10/2003 Watanabe .................... 359/820

FOREIGN PATENT DOCUMENTS

JP    A 8-304739    11/1996
JP    A 2003-121931    4/2003

* cited by examiner

Primary Examiner—Georgia Epps
Assistant Examiner—William Choi
(74) Attorney, Agent, or Firm—Oliff & Berridge, PLC

(57) ABSTRACT

An optical device has: a metal cooling device (500) disposed between a liquid crystal panel (441) and a light-incident side of a cross dichroic prism (443) and having a holding surface for holding polarization plates (521, 522) attached with a polarization films (521A and 522A) in a mutually spaced manner, the cooling device cooling the polarization films; a base (445) provided on the upper and lower sides of the cross dichroic prism (443) and having a cooling device attachment surface (449A) for the cooling device (500) to be attached; and a fixing member (600) provided on a light-incident side of the cross dichroic prism for locating and fixing the liquid crystal panel (441) on the light-incident side, the fixing member (600) being formed with a attachment surface (631) on which a pin (730) for mounting the liquid crystal panel (441) is formed.

44 Claims, 10 Drawing Sheets

OPTICAL DEVICE AND PROJECTOR HAVING THE OPTICAL DEVICE

BACKGROUND OF THE INVENTION

1. Field of the Invention

The present invention relates to an optical device and a projector having the optical device.

2. Description of Related Art

Conventionally, a three-plate projector including a color-separating optical system for separating a light beam irradiated by a light source lamp into three color lights of R, G and B with a dichroic mirror, a three optical modulators (liquid crystal panel) for modulating the separated light beam per each color light in accordance with image information, and an optical device having a cross dichroic prism for combining the light beam modulated by the respective liquid crystal panels has been used.

In an optical device of such a projector, in order to accurately combine the light beam irradiated by the three liquid crystal panels, the three liquid crystal panels are mounted on the cross dichroic prism with high accuracy so that the corresponding picture elements of the three liquid crystal panels are accurately aligned.

Polarization plates for transmitting only the incident light beam in a direction along the polarization axis and for absorbing the light beam in the other direction and irradiating as a predetermined polarized beam, are respectively provided on the incident-side and irradiation-side of the liquid crystal panel. The polarization axis of the incident-side polarization plate and the irradiation-side polarization plate are orthogonal with each other, so that the modulated image light in accordance with image information is formed by the liquid crystal panel.

Such polarization plate ordinarily has a resin polarization film adhered on a glass base plate and such polarization film is likely to be deteriorated (e.g. distorted) on account of rise in temperature caused by absorbing the light. Especially, the irradiation-side polarization plate has to absorb all the unnecessary tight irradiated by the liquid crystal panel in projecting a full-black image onto the screen, thus being easily to be deteriorated.

Accordingly, conventional projector has a cooling mechanism for preventing the polarization film from being excessively heated by circulating cooling air thereinside by a cooling fan etc. However, since the size of the optical device is reduced in accordance with increase in illuminance and size reduction of recent projector and the optical components such as a liquid crystal panel and polarization plate are closely installed, sufficient cooling air cannot be flow through the gap between the respective optical components, so that the polarization film, especially the radiation-side polarization film cannot be sufficiently cooled. Though it is possible to increase the flow rate of the cooling air for efficiently cooling the polarization film, the size of the cooling fan or the number of revolution has to be increased, which runs counter to the requirement of size and weight reduction of projector and inevitably increases the noise.

In order to efficiently cool the polarization film of the irradiation-side polarization plate while rest noise, following arrangement has been conventionally used in an optical device (See Japanese Patent Laid-Open Publication No.2003-121931). An irradiation-side polarization plate with a polarization film adhered thereon is held on a metal holder in a thermally-conductive condition to construct a cooling mechanism. A metal base for fixing a cross dichroic prism is attached on a surface intersecting the light-incident side, and die cooling mechanism is attached on the base, where the liquid crystal panel is attached on the cooling mechanism by a pin. According to the above construction, since the heat generated by the polarization film of the irradiation-side polarization plate can be released to the base through the holder, the polarization film of the irradiation-side polarization plate can be sufficiently cooled without change flow rate of the cooling air etc.

However, in such optical device, since the liquid crystal panel is attached to the base though the cooling mechanism, when the metal base is expanded by the external heat, the metal cooling mechanism is also expanded in accordance with the heat expansion of the base, so that the spatial position of the liquid crystal panel fixed on the cooling device is changed. On the other hand, since a cross dichroic prism ordinarily is difficult to be thermally expanded as compared to a metal base, the cross dichroic prism does not follow the heat expansion of the base. Accordingly, the relative positions between the liquid crystal panel and the cross dichroic prism and, as a result, between the three liquid crystal panels may be shifted, thus causing shift between the picture elements to be combined to deteriorate the image quality of the combined image.

The same disadvantage may be not applied only to a polarization film but also found when an optical conversion film such as viewing angle compensating film and phase film having other optical function and easily causing thermal deterioration is used.

SUMMARY OF THE INVENTION

An object of the present invention is to provide an optical device capable of efficiently cooling an optical conversion film while allowing high illuminance, size reduction and low noise of a projector and preventing picture element shift between optical modulators to improve the image quality of combined image, and a projector having the optical device.

An optical device according to an aspect of the present invention has: a plurality of optical modulators that respectively modulate a plurality of color lights in accordance with image information; a color combining optical device that has a plurality of light-incident sides opposing to the respective optical modulators and combines the color lights modulated by the respective optical modulators; an optical converter interposed between the optical modulator and the light-incident side and having an optical conversion film on a substrate, the optical conversion film optically converting the color light irradiated by the optical modulator, a cooling device having a holding surface on which the optical converter is held, the cooling device being made of a thermally-conductive material and cooling the optical converter; a base provided on a side intersecting the light-incident side of the color combining optical device, the base having a cooling device attachment surface on which the cooling device is attached; and a fixing member attached on the light-incident side which locates and fixes the optical modulator on the light-incident side of the color combining optical device, the fixing member having a attachment surface on which an attachment member for attaching the optical modulator is attached.

As described above, the optical conversion film may be a film such as a polarization film, a viewing angle compensating film and phase film, which converts optical function. Further, the substrate may be made of sapphire glass, silica glass or crystal. The optical converter therefore is a polarization plate, a viewing angle compensating plate, phase plate and the like. The number of such optical converter may not be one but may be no less than two.

The cooling device may be an air-cooling device where two or more optical conversion elements are prepared and cooling air is introduced between the optical conversion elements to cool, and a liquid-cooling device with cooling fluid being sealed in between optical conversion elements to cool. Alternatively, a single optical conversion element may be bonded on a holding plate made of metal etc. through a thermally-conductive adhesive.

The thermally-inductive material constituting the cooling device may be various thermally-conductive materials including metal such as aluminum, magnesium, copper, iron, titanium and alloy thereof, and carbon filler and the like.

The fixing member may be, for instance, a plate body attached on the light-incident side of the color combining optical device.

The attachment member may be designed in any shape such as a pin or a wedge, which may preferably be capable of adjusting the attitude of the optical modulator relative to the light-incident side. The attachment member may preferably be made of a material having small thermal conductivity.

According to the above aspect of the present invention, since the cooling device including the optical converter is mounted on the color combining optical device through the base and the optical modulator is mounted on the color combining optical device through the fixing plate, the cooling mechanism of the optical conversion film and the mount mechanism of the optical modulator to the color combining optical device can be made independent.

Accordingly, for instance, even when heat is applied on the color combining optical device, position shift of the optical modulator relative to the color combining optical device can be restrained by constructing the fixing member with material and configuration being hardly influenced by the thermal expansion of the color combining optical device. Accordingly, picture element shift between a plurality of optical modulators mounted on the color combining optical device can be prevented, thereby improving image quality of the combined image.

Further, since the cooling mechanism of the optical conversion film and the mount mechanism of the optical modulator to the color combining optical device are separately attached to the color combining optical device, the load applied on the attachment portion can be dispersed as compared to a conventional integrated arrangement where all the components are continuously connected, so that anti-shock properties can be improved, thus preventing picture element shift caused by shock.

Since the cooling device is attached on the cooling device attachment surface of the base and the optical converter is held on the holding surface of the cooling device, by being made the base and the substrate with a thermally-conductive material as well as the cooling device, the heat generated on the optical conversion film can be transferred to the cooling device or the base through the substrate to efficiently cool the optical conversion film, thereby lengthening the life of the optical conversion film. Accordingly, when the optical device is used for electronics such as a projector, the optical converter including the optical conversion film can be sufficiently cooled without increasing the flow rate of the cooling air of a conventional air-cooling mechanism, while achieving size reduction, high luminance and low noise of a projector, thereby attaining an object of the present invention.

In the above, the attachment surface of the fixing member may preferably protrude in a light-incident direction relative to the cooling device attachment surface of the base, and a cut corresponding to the attachment surface of the fixing member may preferably be formed on the cooling device.

In the above arrangement, the cut on the cooling device may be formed by cutting a corner of a rectangular cooling device. The fixing member may be a rectangular plate which has an attachment portion protruding in light-incident direction from the corners of the rectangle and having the attachment surface on the distal side thereof.

According to the above arrangement, since the distance between the optical modulator and the attachment surface can be reduced, the length of the attachment member can be reduced and the load applied on the attachment portion between the attachment member and the attachment surface can be minimized, thus lengthening the life of the optical device.

In the above, the base may preferably include: a plate-shaped base body fixed on a side intersecting the light-incident side; and a projection projecting from both lateral sides of the base body toward the light-incident side, the projection having the cooling device attachment surface on the distal side thereof.

According to the above arrangement, since a gap corresponding to the protrusion amount of the projection is formed between the projections formed on both peripheral ends of the base, the optical converter including the optical conversion film the fixing member and the light-incident side of the color combining optical device on which the fixing member is mounted can be directly cooled by feeding cooling air to the gap, thus further preventing thermal deterioration of the optical conversion film.

In the above, a stress relief that relieves a stress caused by a difference in thermal expansion coefficient of the material of the fixing member and the material of the color combining optical device may preferably be provided on the fixing member.

The stress relief may be constructed by a slit and cut formed on the plate-shaped component attached on the light-incident side.

According to the above arrangement, since the stress caused by heat can be absorbed by the stress relief even when the fixing member is expanded by the external heat, the position shift of the fixing member relative to the light-incident side can be securely prevented.

In the above, the base may preferably be provided respectively on a pair of sides intersecting the light-incident side of the color combining optical device, and the cooling device may preferably be attached spanning over the cooling device attachment surfaces of the pair of bases.

According to the above arrangement, since the thermal capacity increases by the provision of the pair of bases, the heat generated on the optical conversion film can be further efficiently transferred. Further, since the cooling device is provided spanning over the pair of bases, the attitude of the cooling device relative to the color combining optical device can be stabilized.

In the above, the optical modulator may preferably be a rectangular plate having an optical modulator body and a holding frame that holds the optical modulator body, a hole penetrating along a light-incident direction may preferably be formed on a corner of the holding frame, the attachment member may preferably be a pin inserted to the hole, and an end of the pin may preferably be attached on the attachment surface of the fixing member.

When the above-described cut is formed on the corner of the cooling device in the above arrangement, the cooling mechanism of the optical conversion film and the mount mechanism of the optical modulator can be made independent with a simple construction by inserting the pin through the hole formed on the corner of the holding frame and the cut and bonding an end of the pin on the attachment surface of the fixing member.

In the above, the corner having the hole may preferably be recessed toward the attachment surface of the fixing member relative to a light-irradiation side of the optical modulator body.

According to the above arrangement, since the attachment surface of the fixing member and the corner on which the hole is formed are closely located, the length of the pin inserted to the hole can be shortened. Accordingly, the load applied on the bonding portion of the pin can be minimized, thus restraining position shift of the optical modulator and further preventing deterioration in the image quality of the combined image.

In the above optical device, a holding plate that holds the optical modulator may preferably be attached on the light irradiation side of the optical modulator, a hole penetrating along a light-incident direction may preferably be formed on a corner of the holding plate, the attachment member may preferably be a pin to be inserted to the hole, and an end of the pin may preferably be attached on the attachment surface of the fixing member.

According to the above arrangement, a conventional optical modulator can be attached on the holding plate to be attached on the attachment surface of the fixing member through the pin as described above, so that newly arranged optical modulator is not necessary, thereby reducing the production cost of the optical device. In the above, a rising portion may preferably be formed at the periphery of the hole of the holding plate, the rising portion may preferably be raised in an out-plane direction.

According to the above arrangement, since sufficient bonding area between the pin and the holding plate can be secured by the rising portion formed on the periphery of the hole, the holding plate provided with the optical modulator can be securely fixed on the fixing member by coating an adhesive on the rising portion having sufficient bonding area.

In the above, the optical converter may preferably include no less than two optical conversion element, the cooling device may preferably have a holding surface that spaces apart the no less than two optical conversion elements in a light-incident direction, and the space between the no less than two optical conversion elements may preferably be a cooling chamber for a coolant to be sealed in.

According to the above arrangement, the cooling chamber can be constructed by sealing the coolant in the space between the no less than two optical converters, so that the heat generated on the optical conversion film can be easily transferred to the coolant in the cooling chamber, thus further preventing thermal deterioration of the optical conversion film.

In the above optical device, the optical converter may preferably include no less than two optical conversion element, the cooling device may preferably have a plurality of support plates for the no less than two optical conversion elements to be fixed through a thermally-conductive material and a holder having a holding surface that spaces apart the plurality of support plates in a light-incident direction, and the holder may preferably have a wind guide that introduces a cooling air.

According to the above arrangement, the optical conversion film of the no less than two optical converters can be efficiently cooled by forming the wind guide and introducing a cooling air thereto.

In the above, the holder may preferably have a guiding groove that guides opposing sides of the support plate, and the plurality of support plates may preferably be attachable to and detachable from the holding surface long an extending direction of the opposing sides.

According to the above arrangement, even after the optical device is assembled, only the optical converter can be easily exchanged without detaching the components other than the optical converter, thereby facilitating assembly and repair work.

In the above, the cooling device may preferably include a pressing member disposed on a light-incident side of one on a light-incident side of the plurality of the support plates located most adjacent to the light-incident side and may preferably have a pressing member that presses the support plate located most adjacent to the light-incident side toward the holder.

According to the above arrangement, since the support plate is pressed toward the holder by the pressing member, the position shift of the support plate, i.e. the optical converter can be prevented. Further, by constructing the pressing member from a thermally-conductive material, the heat generated on the optical conversion film can be also transferred to the pressing member.

Further, the pressing member may preferably be provided with a thermally-conductive elastic member that biases the support plate on located most adjacent to the light-incident side toward the holder.

The elastic member may be constructed by an independent component attached on the pressing member or a convex portion protruding on a part of the pressing member toward the holder.

According to the above arrangement, since the support plate is pressed toward the holder by the thermally-conductive elastic member formed on the pressing member, the support plate and the holder can be closely attached even when there are some deviations in the outer profiles of the support plate. Accordingly, the heat generated on the optical conversion film can be further securely transferred toward the holder. Further, since the elastic, member has thermal conductivity, the heat can also be transferred to the pressing member.

In the above, the substrate may preferably be made of a material selected from a group consist of sapphire glass, crystal and silica glass.

According to the above arrangement, since the optical conversion film is adhered on sapphire glass, crystal and silica glass having high thermal conductivity, the heat generated on the optical conversion film can be transferred to the cooling device or the base, thus further lengthening the life of the optical conversion film.

The base and/or the cooling device may preferably be made of metal.

According to the above arrangement, since the base and the cooling device are made of metal having high thermal conductivity, the heat generated on the optical conversion film can be transferred to the cooling device and the base, thus further lengthening the life of the optical conversion film.

A heat release fin may preferably be provided on an outer circumference of the cooling device.

According to the above arrangement, the heat transfer of the heat generated on the optical conversion film toward the cooling device can be accelerated by blowing cooling air on the heat radiation fin formed on the outer circumference of the cooling device, thus further efficiently cooling the optical conversion film.

In the above, the optical conversion film may preferably be a polarization film.

The polarization film may be a poly-halogen polarization film on which halogen compound such as iodine is absorbed, a dye polarization film on which a dyestuff is absorbed and dispersed, and metal polarization film having metal salt absorbed on a macromolecule film.

Since such polarization film absorbs incident light to be heated, the optical device of the present invention can be suitably applied.

A projector of the present invention is characterized by comprising the above-described optical device.

According to the present aspect of the present invention, a projector capable of attaining approximately the same function and effect as the optical device can be provided, where high luminance, size and noise reduction of the projector can be achieved while efficiently cooling the optical converter, and the picture element shift of the optical modulator can be prevented to improve the image quality of the projection image.

DETAILED DESCRIPTION OF PREFERRED EMBODIMENT(S)

[First Embodiment]

A projector according to a first embodiment of the present invention will be described below with reference to attached drawings.

[1-1. Primary Arrangement of Projector]

Figure 1:
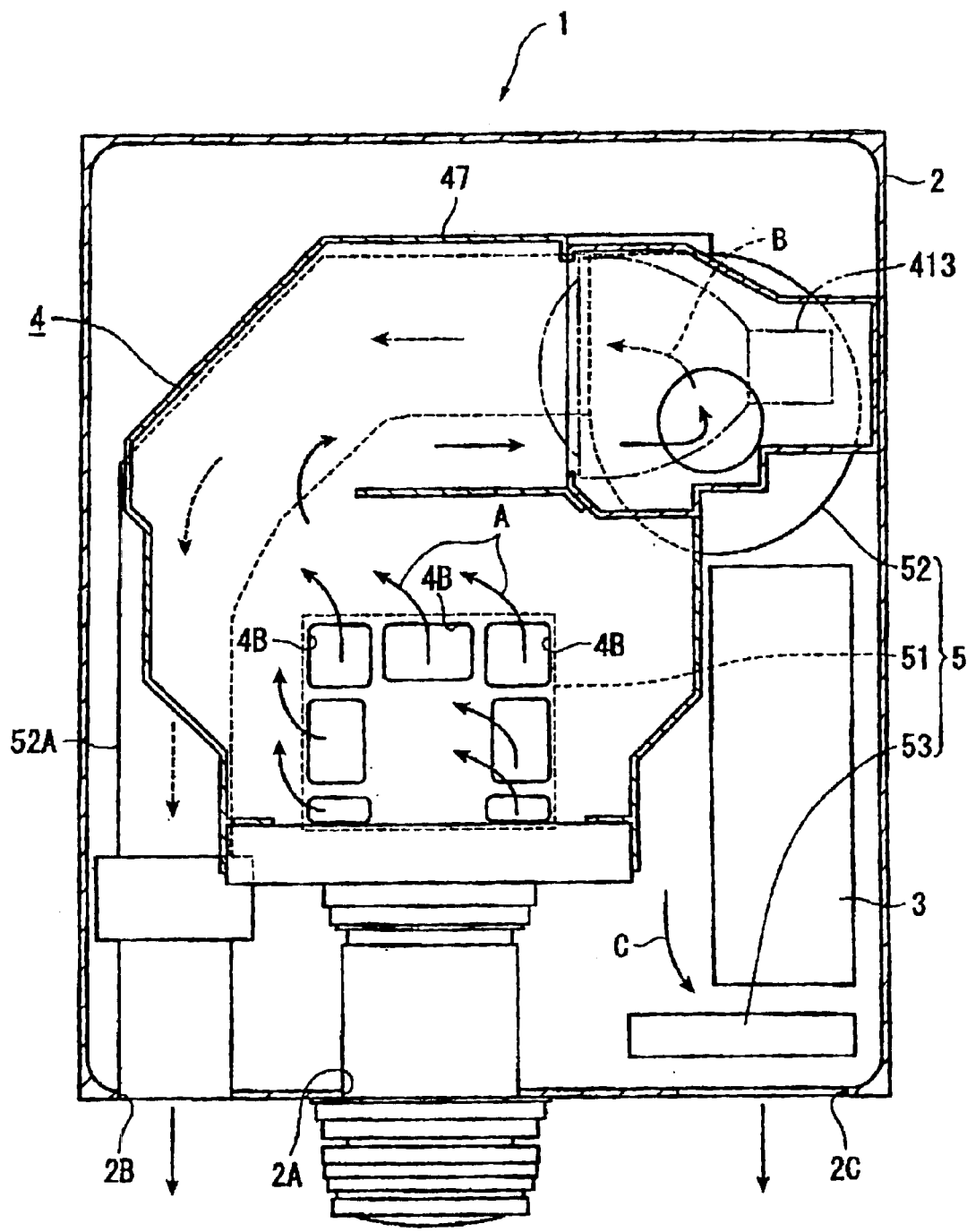
FIG. 1 is a plan view schematically showing an internal construction of a projector according to a first embodiment.

FIG. 1 is a plan view schematically showing an internal construction of a projector 1 according to the first embodiment of the present invention The projector 1 has an approximately rectangular-parallelepiped resin-made exterior case 2, an optical unit 4 for forming an optical image in accordance with image information by optically processing a light beam irradiated by a light source 413, a cooling unit 5 for releasing heat generated inside the projector 1, and a power source unit 3 for feeding electric power supplied from the outside to the units 4, 5 and the like.

The exterior case 2 accommodates the units 3 to 5, which includes (not specifically shown) an upper case constituting the upper side, front side and lateral side of the projector 1 and a lower case constituting the lower side, lateral side, and rear side of tee projector 1.

As shown in FIG. 1, a cut 2A is formed on the front side of the exterior case 2. A part of the optical unit 4 accommodated in the exterior case 2 is exposed to the outside from the cut 2A. Exhaust holes 2B and 2C for discharging the air inside the projector 1 are formed on both sides of the cut 2A on the front side of the exterior case 2. A non-illustrated intake port for drawing in a cooling air from the outside is formed on the lower side of the exterior case at a position corresponding to below-described optical device 44 of the optical unit 4.

As shown in FIG. 1, the power source unit 3 is disposed on the right side (in the figure) of the optical unit 4 in the exterior case 2. Though not specifically shown, the power source unit 3 is for supplying electric power supplied through a power cable plugged into an inlet connector to a lamp driving circuit (ballast), driver board (not shown) etc.

The lamp driving circuit supplies the supplied electric power to a light source lamp 411 of the optical unit 4. Though not shown, the driver board is disposed above the optical unit 4 and controls below-described liquid crystal panels 441R, 441G and 441B after arithmetic processing the inputted image information.

The power source unit 3 and the optical unit 4 are covered with a metal shield plate made of aluminum, magnesium, or the like. The lamp driving circuit and the driver board are also covered with a metal shield of aluminum, magnesium, or the like. Accordingly, the leakage of electromagnetic noise from the power source unit 3 or the driver board to the outside is prevented.

The cooling unit 5 cools the inside of the projector 1 by drawing a cooling air into a flow path inside the projector 1, having the cooling air absorb the heat generated inside the projector 1, and discharging the heated cooling air to the outside. The cooling unit 5 6 has an axial-flow intake fan 51, a sirocco fan 52 and an axial-flow exhaust fan 53.

The axial-flow intake fan 51 is disposed below the optical device 44 of the optical unit 4 and above the intake port of the exterior case 2. The axial-flow intake fan 51 draws in the cooling air from the outside to the inside of the optical unit 4 through the intake port to cool the optical device 44.

The sirocco fan 52 is disposed below the light source 413 of the optical unit 4. The sirocco fan 52 draws in the cooling air inside the optical unit 4 drawn in by the axial-flow intake fan 51 while drawing heat from the light source 413, and discharges the heated cooling air from the exhaust holes 2B to the outside through a duct 52A disposed under the optical unit 4.

The axial-flow exhaust fan 53 is disposed between the exhaust hole 2C formed on the front side of the exterior case 2 and the power source unit 3. The axial-flow exhaust fan 53 draws in the heated air around the power source unit 3 and discharges the heated air from the exhaust hole 2C to the outside.

[1-2. Arrangement of Optical Unit]

Figure 2:
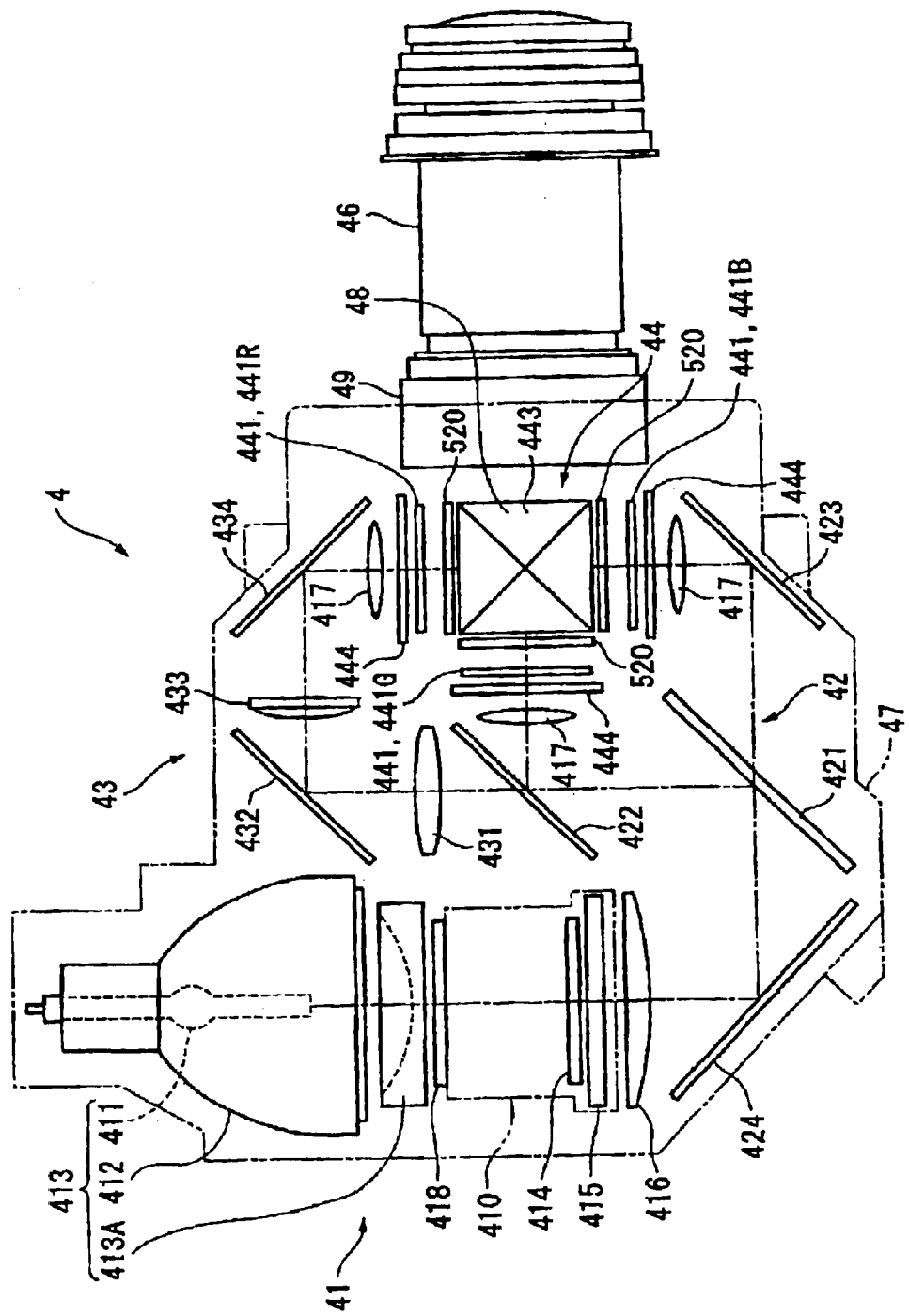
FIG. 2 is a plan view schematically showing an optical unit according to the first embodiment.

FIG. 2 is a plan view schematically showing the optical unit 4.

As shown in FIG. 2, the optical unit 4 is a planarly-viewed L-shaped component for optically processing the light beam irradiated by the light source lamp 411 to form an optical image in accordance with image information, which includes an integrator illumination optical system 41, a color separating optical system 42, a relay optical system 43, an optical system 44 and a projection lens 46 as a projection optical system. The optical components 41 to 44 and 46 are accommodated and fixed in a light guide 47 as an optical component casing.

As shown in FIG. 2, the integrator illuminating optical system 41 is an optical system for approximately uniformly illuminating the image formation area of three liquid crystal panels 441 (represented as liquid crystal panels 441R, 441G and 441B for red, green and blue color, respectively) of the optical device 44, which includes the light source 413, a first lens array 418, a second lens array 414, a polarization converter 415 and a superposing lens 416.

The light source 413 has the light source lamp 411 for irradiating radial light beam, an ellipsoidal mirror 412 for reflecting the radial light beam irradiated by the light source lamp 411, a concave lens 413A for parallelizing the light beam irradiated by the light source lamp 411 and reflected by the ellipsoidal mirror 412. Incidentally, not-illustrated UV filter is provided on the planar portion of the concave lens 413A. A halogen lamp, metal halide lamp and high-pressure mercury lamp are used for the light source lamp 411. A parabolic mirror may be used instead of the ellipsoidal mirror 412 and the concave lens 413A.

The first lens array 418 has a plurality of small lenses having approximately rectangular profile arranged in matrix seen in the optical axis direction. The respective lenses separates the light beam radiated by the light source lamp 411 into a plurality of sub-beams. The profile of the small lenses is similar figure to the configuration of the image formation area of the liquid crystal panel 441. For instance, when the aspect ratio (ratio of the horizontal and vertical dimensions) of the liquid crystal panel 441 is 4:3, the aspect ratio of the respective lenses is set to be 4:3.

The second lens array 414 has approximately the same arrangement as the first lens array 418, which has small lenses arranged in matrix. The second lens array 414 focuses the image of the lenses of the first lens array 418 on the liquid crystal panel 441 together with the superposing lens 416.

The polarization converter 415 is disposed between the second lens array 414 and the superposing lens 416 and is integrated with the second lens array 414 as a unit. Such a polarization converter 415 converts the light from the second lens array 414 into a uniform polarization light, thus enhancing the utilization efficiency of the light by the optical device 44. As shown in double dotted line 410 in FIG. 1, the polarization converter 415 and the second lens array 414, which are integrated as a unit, and the first lens array 418 are integrated as a unit.

Specifically, the respective sub-beams converted into a uniform polarization light by the polarization converter 415 are approximately superposed on the liquid crystal panels 441R, 441G and 441B of the optical device 44 by the superposing lens 416. Since only a single polarization light can be used in the projector 1 (optical device 44) which uses the liquid crystal panel 441 for modulating the polarization light, approximately half the light from the light source lamp 411 generating other random polarization light is not utilized Accordingly, with the use of the polarization converter 415, all of the light beam irradiated by the light source lamp 411 is converted into uniform polarization light to enhance the light utilization efficiency of the optical device 44. Such a polarization converter 415 is shown in, for instance, Japanese Patent Laid-Open Publication No. Hei8-304739.

The color separating optical system 42 has two dichroic mirrors 421 and 422, and reflection mirrors 423 and 424, which separates the plurality of sub-beams irradiated by the integrator illuminating optical system 41 into three color lights of red, green and blue by the dichroic mirrors 421 and 422.

The relay optical system 43 has an incident-side lens 431, a relay lens 433, and reflection mirrors 432 and 434, which guides the color light (red light) separated by the color separating optical system 42 to the liquid crystal panel 441R.

In the optical system 41,42 and 43, the blue light component of the light beam irradiated by the integrator illumination optical system 41 transmits through the dichroic mirror 421 of the color separating optical system 42 and the red and green light components are reflected by the dichroic mirror 421. The blue light component transmitted through the dichroic mirror 421 is reflected by the reflection mirror 423 and reaches to the blue color liquid crystal panel 441B through a field lens 417. The field lens 417 converts the respective sub-beams irradiated by the second lens array 414 into a light beam parallel with the central axis (main beam) thereof. The field lens 417 provided on the light-incident side of the other liquid crystal panels 441R and 441G functions in the same manner.

In the red and green lights reflected by the dichroic mirror 421, the green light is reflected by the dichroic mirror 422 to reach the green color liquid crystal panel 441G through the field lens 417. On the other hand, the red light transmits through the dichroic mirror 422 to pass the relay optical system 43 and reaches the red color liquid crystal panel 441R through the field lens 417. Incidentally, the relay optical system 43 is used for the red light to prevent deterioration of light utilization efficiency caused by dispersion of light on account of longer optical path of the red light than the other color lights, i.e. in order to directly transmit the sub-beams incident on the incident-side lens 431 to the field lens 417. Incidentally, though it is configured that the red light of the three color lights is transmitted to the relay optical system 43, the other color light such as blue light may be transmitted therethrough.

The optical device 44 forms a color image by modulating the incident light beam in accordance with image information, which includes an incident-side polarization plate 444 as a polarizer on which the light beam irradiated by the color-separating optical system 42 is incident, the three liquid crystal panels 441R, 441G and 441B as an optical modulator disposed on the downstream of the optical path of the respective incident-side polarization plate 444, an inflation-side polarization plate 520 as an analyzer disposed on the downstream of the optical path of the respective liquid crystal panels 441R, 441G and 441B, and a cross dichroic prism 443. The optical components 441, 443 and 520 are integrated to form an optical device body 48. The details of the optical device body 48 will be described below.

The incident-side polarization plate 444 is constructed as a body independent of the optical device body 48. The incident-side polarization plate 444 transmits only the polarization light in a predetermined direction among the light beams separated by the color-separating optical system 42 and absorbs the polarization light in the other direction. Incidentally, the polarization axes of the incident-side polarization plate 444 and the irradiation-side polarization plate 520 are orthogonal with each other.

The above-described optical components 41 to 44 are accommodated in the light guide 47 made of synthetic resin as an optical component casing.

Though not illustrated, the light guide 47 has a lower light guide having a groove for slidably fitting the above-described optical components 414 to 418, 421 to 423, 431 to 434 and 444 (FIG. 2) from the above, and a lid-shaped upper light guide for closing the upper opening of the lower light guide. The light source 413 is accommodated on one end of the planarly-viewed approximately L-shaped light guide 47 and the projection lens 46 is fixed on the other end through a head 49.

[1-3. Arrangement of Optical Device Body Constituting Optical Device]

Figure 3:
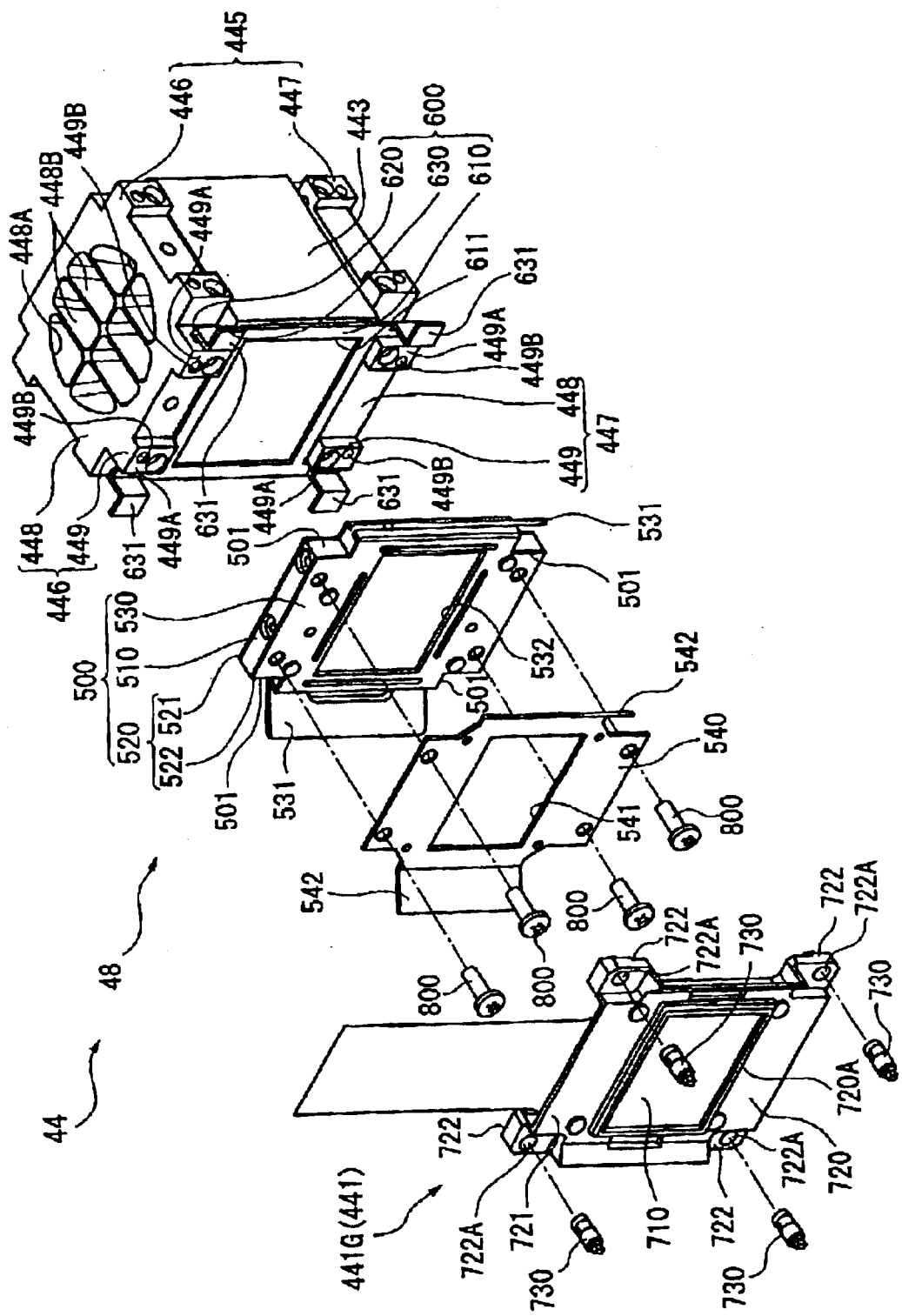
FIG. 3 is an exploded perspective view showing an optical device body of the first embodiment.
Figure 4:
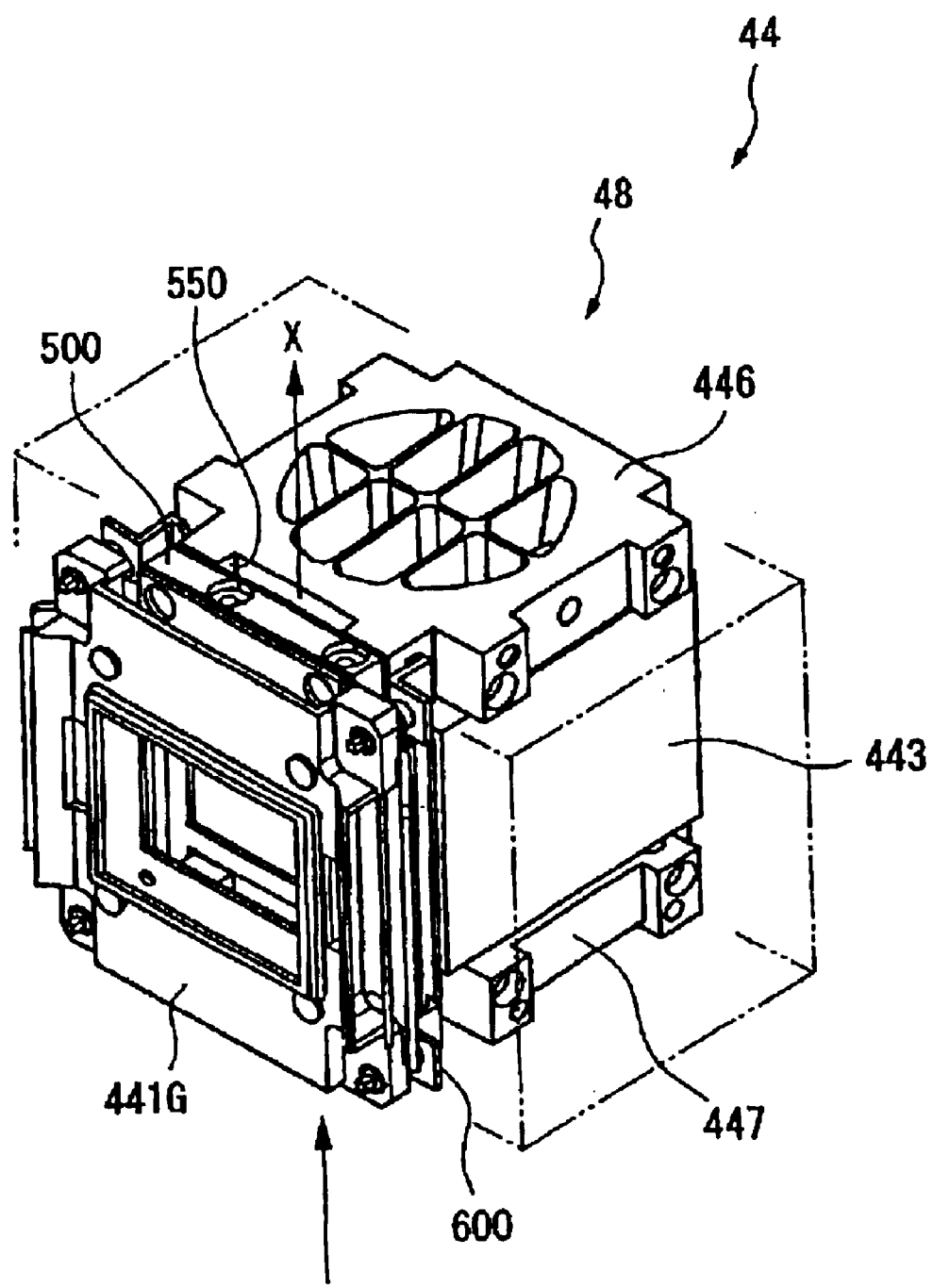
FIG. 4 is a perspective view showing the optical device body of the first embodiment.

FIG. 3 is an exploded perspective view showing the optical device body 48 of the optical device 44. FIG. 4 is a perspective view showing the optical device body 48. Incidentally, the liquid crystal panel 441G is shown in FIG. 3 representing the three liquid crystal panels 441 and the other liquid crystal panels 441R and 441B are not illustrated.

As shown in FIG. 3, the optical device body 48 has the cross dichroic prism 443, bases 445 attached on the upper and lower side of the cross dichroic prism 443 approximately orthogonal with light-incident side of the cross dichroic prism 443, a cooling device 500 attached to the base 445, a fixing member 600 positioned and fixed on the light-incident side of the cross dichroic prism 443, and the liquid crystal panel 441G (441) attached to the fixing member 600.

The cross dichroic prism 443 combines the image irradiated by the three liquid crystal panels 441R, 441G and 441B and modulated for the respective color lights to form a color image, which is constructed as an approximately cubic hexahedron.

The cross dichroic prism 443 is formed with a dielectric multi-layer film for reflecting red light and another dielectric multi-layer film for reflecting blue light are formed along the boundary of four right-angle prisms in approximately X-shape, the dielectric multi-layer films combining three color lights. The color image combined by the cross dichroic prism 443 is irradiated from the projection lens 46 to be enlarged and projected on a screen.

The base 445 supports and fixes the cross dichroic prism 443 and the cooling device 500 is attached thereon, the base 445 including an upper base 446 fixed on the upper side of the cross dichroic prism 443 and a lower base 447 fixed on the lower side of the cross dichroic prism 443.

The upper base 446 fixes the upper portion of the cooling device 500, which has approximately the same outer dimension as the upper surface of the cross dichroic prism 443 and is made of alloy of aluminum or magnesium.

The upper base 446 has a substantially plate-shaped base body 448 fixed on the upper side of the cross dichroic prism 443 and a rectangular parallelepiped projection 449 formed on three sides of the base body 448 to project in a direction for a light to be irradiated on the prism 443.

The base body 448 is also used for mounting the base to the light guide 47. A concave portion 448A bored in approximately circular shape is formed at the center of the base body 448 and a plurality of louver-shaped fins 448B are formed inside the circular concave portion 448A. The base body 448 can easily release the heat by the increased contact area with the cooling air by providing the fins 448B.

The projection 449 projects from peripheries of the three sides of the base body 448 in the light-incident directions. Accordingly, a gap is formed between the projections 449 formed on the opposing ends on the three sides. The distal end of the projection 449 is a rectangular plane. The rectangular plane on the distal end is a cooling device attachment surface 449A for the cooling device 500 to be attached. A screw hole 449B for screwing the cooling device 500 is formed on the cooling device attachment surface 449A.

The lower base 447 has approximately the same construction as the upper base 446 and fixes the lower portion of the cooling device 500, which has approximately the same outer dimension as the lower side of the cross dichroic prism 443 and is an approximately rectangular parallelepiped made of alloy of aluminum or magnesium. The lower base 447 also has the projection 449 having the cooling device attachment surface 449A and the screw hole 449B in the same manner as the above-described upper base 446.

As shown in FIG. 4, when the cooling device 500 is attached bridging the upper base 446 and the lower base 447, since the projection 449 projects in the light-incident direction, a space is formed between the light-incident side of the cross dichroic prism 443 and the cooling device 500. The space is a wind guide 550 for flowing the cooling air X.

Figure 5:
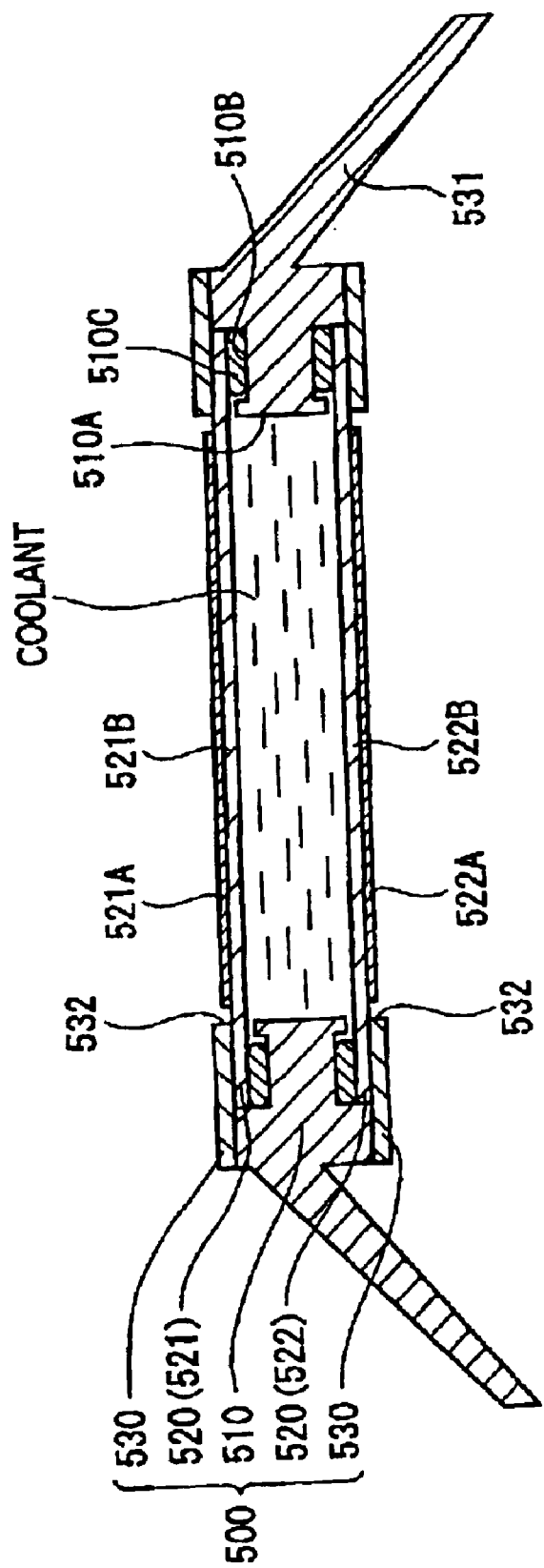
FIG. 5 is a cross section showing a structure of a cooling device of the first embodiment.

FIG. 5 is a cross section showing the structure of the cooling device 500.

As shown in FIG. 3, the cooling device 500 is a rectangular metal plate. A cut 501 of approximately rectangular cross section is formed on the corners of the rectangular cooling device 500.

As shown in FIG. 3 or 5, the cooling device 500 has a rectangular plate-shaped cooling container 510, a pair of polarization plates 521 and 522 constituting the irradiation-side polarization plate 520, the pair of polarization plate 521 and 522 sandwiching the cooling container 510, and a support frame 530 for pressing the pair of polarization plates 521 and 522 toward the cooling container 510 to support the polarization plates, where the pair of polarization plates 521 and 522 are cooled.

As shown in FIG. 5, a rectangular opening corresponding 510A to the image formation area of the liquid crystal panel 441G is formed on the plate-shaped cooling container 510. Further, holding surfaces 510B encircling the opening are respectively formed on front and back sides of the cooling container 510. The pair of polarization plates 521 and 522 are provided on the holding surfaces 510B through a sealing member 510C, so that the opening forms a closed space. A coolant of transparent and non-volatile liquid such as ethylene glycol is sealed inside the closed space through a coolant injection port formed on the upper side of the cooling container 510. Accordingly, the closed space works as a cooling chamber.

The pair of polarization plates 521 and 522 are constructed by combining the same polarization plates with polarization axes thereof being aligned, which has, though not illustrated, polarization films 521A and 522A and substrates 521B and 522B on which the polarization film is adhered.

The polarization films 521A and 522A are rectangular films, which are formed by: forming a film by absorbing and dispersing iodine in polyvinyl alcohol PVA); orienting (drawing) the film in a predetermined direction; and laminating acetate cellulose film on both sides of the oriented film by an adhesive.

The substrates 521B and 522B are rectangular plate members made of sapphire glass. The substrate has high thermal conductivity of approximately 40W/(m·K) and extremely high hardness, so that the substrates 521B and 522B are not easily damaged and is extremely transparent. Incidentally, a crystal having thermal conductivity of approximately 10W/(m·K) may be used for attaining medium luminance with low cost Alternatively, silica glass may also be preferably used.

The support frame 530 is a metal member made of aluminum, magnesium or the like for covering and holding the polarization plates 521 and 522 from both front and rear side thereof so that the polarization plates 521 and 522 are not detached from the cooling container 510, which is constructed as double-bodied frame member. A rectangular opening 532 for transmitting the light beam is formed on the support frame 530 corresponding to the cooling chamber of the cooling container 510. A heat release fin 531 is formed on both sides of the outer circumference of the support frame 530.

A heat sink 540 is formed on the light-incident side of the cooling device 500. The heat sink 540 is a metal plate member of approximately the same profile as the light-incident side of the support frame 530. A rectangular opening 541 for transmitting the light beam is formed at the central portion of the heat sink 540 and a heat release fin 542 is formed on both sides thereof.

Screw insert holes are formed on the cooling container 510, the support frame 530 and the heat sink 540 in a corresponding manner as shown in FIG. 3, through which the cooling container 510, the support frame 530 and the heat sink 540 are screwed to the screw holes 449B of the cooling device attachment surface 449A of the base 445 by screws 800.

As described above, the polarization films 521A and 522A of the pair of polarization plates 521 and 522 are directly cooled by exchanging heat with the coolant within the cooling chamber.

The base 445, the cooling device 500 and the heat sink 540 are made of metal of high thermal conductivity and are capable of transferring heat with each other. Accordingly, the heat generated on the polarization films 521A and 522A of the pair of polarization plates 521 and 522 is transferred to the base 445 and the heat sink 540, so that the area to be in contact with the cooling air introduced from the lower side increases and efficiency of the heat exchange with the cooling air can be enhanced, thus efficiently cooling the polarization films 521A and 522A by the two cooling mechanisms.

The fixing member 600 is a steel component for defining the position of the liquid crystal panel 441G on the light-incident side of the cross dichroic prism 443, and fixing it. As shown in FIG. 3, the fixing member 600 has approximately the same profile as the light-incident side of the cross dichroic prism 443, which includes a fixing plate 610 bonded to the light-incident side, an extension 620 vertically extending from the corners of the fixing plate 610, and a fixing plate projection 630 projecting from the extension 620 in a direction for the light to be incident on the prism 443.

The fixing plate 610 is a rectangular plate member provided with rectangular opening 611 at the central portion thereof for transmitting the light beam A slit (not shown) as a stress relief for relieving stress caused by the difference in thermal expansion coefficient between the metal of the fixing member and the material of the cross dichroic prism 443 is provided on the sides of the opening 611.

The extension 620 is arranged so that the extension 620 sticks out from the light-incident side toward the upper and the lower bases 445 to be located adjacent to the external side of the projection 449 of the base 445 when the fixing plate 610 is bonded on the light-incident side of the cross dichroic prism 443.

The fixing plate projection 630 is bent from the surface of the extension 620 in planarly-viewed L-shape and the distal end of the bent portion is flatly shaped. When the fixing plate 610 is bonded to the light-incident side, the end surface of the flat plane is arranged approximately parallel with the cooling device attachment surface 449A of the base 445 and is projected to the light-incident side relative to the cooling device attachment surface 449A. The end surface works as a attachment surface 631 for an end of a later described pin member for attaching the liquid crystal panel 441G to be bonded thereon.

As shown FIG. 3, the liquid crystal panel 441G has a liquid crystal panel body 710 as an optical modulator body and a panel holding frame 720 as a frame for holding the liquid crystal panel body 710 and is of approximately rectangular plate-shape. The liquid crystal panel 441G has a pin 730 for fixing the panel holding frame 720 to the attachment surface 631.

Though not specifically shown, the liquid crystal panel body 710 has a driver board and an opposing board made of glass, and liquid crystal injected between the boards.

A switching element such as TFT element, a picture element electrode made of transparent electric conductor such as ITO (Indium Tin Oxide), a wiring and an orientation film are formed inside the driver board. An opposing electrode corresponding to the picture element electrode and an orientation film are formed on the inner side of the opposing board. An active-matrix liquid crystal panel is formed by the above arrangement.

The panel holding frame 720 is a frame member having a rectangular opening 720A corresponding to the image formation area of the liquid crystal panel 441G, which is made of metal material such as magnesium, aluminum, titanium and the like, or resin material containing carbon filler and the like. The panel holding frame 720 has a rectangular plate-shaped frame body 721, and a step portion 722 which is of rectangular shape seen from front direction, the step portion 722 being formed as a recess on the corners of the frame body 721 dented toward the light-irradiation side.

The four step portions 722 correspond to the cut 501 of the cooling device 500 and are opposed to the attachment surface 631 of the fixing member 600 at the close position when the panel holder 720 is assembled as the optical device body 48. Pin holes 722A of circular cross sectional shape penetrating in the light-incident direction for the pins 730 to be inserted are provided on the respective step portions 722.

The pin 730 is inserted to the pin hole 722A and is an acryl transparent pin capable of transmitting ultraviolet. An end of the pin 730 is bonded on the attachment surface 631 and the other end is bonded on the panel holding frame 720. The other end of the pin 730 and the panel holding fame 720 are bonded by an ultraviolet-curing adhesive and irradiating ultraviolet thereon.

In sum, as shown in FIG. 4, the liquid crystal panel 441G is fixed on the light-incident side of the cross dichroic prism 443 in a manner independent of the cooling device 500 through the fixing member 600.

The cooling device 500 is arranged to be accommodated inside the projection 630 of the four fixing members 600, thus not hindering size reduction of the optical device body 48.

[1-4. Cooling Mechanism]

Next, an arrangement of air-cooling mechanism provided on the projector 1 will be described below. As shown in FIG. 1, the projector 1 has an optical device cooling system A mainly for cooling the optical device 44 (FIG. 2), a light source cooling system B mainly for cooling the light source 413 and a power source cooling system mainly for cooling the power source unit 3.

The optical device cooling system A has the non-illustrated intake port formed on the lower side of the exterior case 2, the axial-flow intake fan 51 provided above the intake port, an opening 4B formed above the axial-flow intake fan 51 on the bottom side of the light guide 47, and the wind guide 550 (FIG. 4) for flowing the cooling air X in the optical device 44 disposed above the opening 4B.

The fresh cooling air of the outside of the projector 1 is drawn in by the axial-flow intake fan 51 through the intake port of the exterior case 2, which enters into the light guide 47 through the opening 4B. At this time, though not illustrated, a straightener board is provided on the lower side of the light guide 47, the straightener board straightening the cooling air outside the light guide 47 to flow from the lower side to the upper side.

As shown in the arrow in FIG. 4, the cooling air introduced into the light guide 47 is straightened to flow vertically in the optical device 44 to flow through the front and back sides of the wind guide 550 and the liquid crystal panel 441G to the upper side of the optical device body 48 while cooling the cooling device 500, the base 445, the liquid crystal panel 441G and the incident-side polarization plate 444 and the like. At this time, the polarization films 521A and 522A are efficiently cooled by the heat release fins 531 and 542.

In the optical device cooling system A, the circulating cooling air not only cools the optical device 44 but also blows off the dust deposited on the surface of the liquid crystal panels 441R, 441G and 441B etc. Accordingly, the surface of the liquid crystal panels 441R, 441G and 441B can be always kept clean, thus maintaining stable image quality.

As shown in FIG. 1, the light source cooling system B has the sirocco fan 52, the duct 52A and the exhaust hole 2B. In the light cooling system B, the cooling air passing through the optical device cooling system A is sucked by the sirocco fan 52 to enter into the light source 413 to cool the light source lamp 411 and, subsequently, is blown out from the light guide 47 to be discharged through the duct 52A toward the outside through the exhaust hole 2B.

The power source cooling system C has the axial-flow exhaust fan 53 provided around the power source unit 3 and the exhaust hole 2C. In the power source cooling system C, the air heated by the power source unit 3 is drawn in by the axial-flow exhaust fan 53 to be discharged from the exhaust hole 2C. At this time, the air in the entire projector 1 is simultaneously discharged so that the heat does not remain inside the projector 1.

[1-5. Advantages of First Embodiment]

According to the present embodiment, following advantages can be obtained.

(1) Since the cooling device 500 is attached to the cross dichroic prism 443 through the base 445 and the liquid crystal panel 441 is provided on the cross dichroic prism 443 through the fixing member 600, the cooling mechanism of the polarization films 521A and 522A and the mount mechanism of the liquid crystal panel on the cross dichroic prism 443 can be made independent.

(2) Since the both of the mechanisms can be made independent, even when the base 445 is thermally expanded by the heat applied around the cross dichroic prism 443, the fixing member 600 is directly attached on the cross dichroic prism 443 which is not influenced by the thermal expansion of the base 445 and is difficult to expand, so that the picture element shift between the three liquid crystal panels 441 provided on the cross dichroic prism 443 can be prevented, thus improving the image quality of the combined image.

Further, since the slit-shaped thermal stress relief is formed on the fixing member 600, even when the fixing member 600 is expanded by the external heat, the thermal stress is absorbed, thus securely preventing position shift of the fixing member 600 from the light-incident side.

(3) As compared to a conventional two-decker arrangement of continuously bonding all the components, the load applied on the attachment portion of the base 445 and the two-decker component can be dispersed, thus improving anti-shock properties and preventing picture element shift caused by impulse.

(4) Since the base 445 and the cooling device 500 are made of metal and are in contact with each other, the heat generated on the polarization films 521A and 522A can be transferred to the cooling device 500 and the base 445 through the substrate, so that the polarization films 521A and 522A can be efficiently cooled to lengthen the life thereof. At this time, since the base 445 is provided on the upper and lower sides of the cross dichroic prism 443, heat capacity thereof can be increased and the area to be in contact with the cooling air can be increased, thus further efficiently cooling the optical device.

(5) Since the cooling device 500 having the cooling chamber in which the coolant is sealed is formed between the pair of polarization plates 521 and 522, the heat generated on the polarization films 521A and 522A can be rapidly transferred to the coolant inside the cooling chamber, thus preventing deterioration of the polarization films 521A and 522A.

(6) Since the substrates 521B and 522B are made of sapphire glass having high thermal conductivity, the heat generated by the polarization films 521A and 522A can be securely transferred to the cooling device 500 or the base 445 to lengthen the life of the polarization films 521A and 522B. In the same manner since the base 445 and the cooling device 500 are made of metal having high thermal conductivity such as aluminum, magnesium and the like, the life of the polarization films 521A and 522A can be further lengthened.

(7) Since the heat release fin 531 is formed on both sides of the cooling device 500, conduction of the heat generated on the polarization films 521A and 522A to the cooling device 500 can be accelerated by bringing the cooling air against the heat release fin 531, thus further efficiently cooling the polarization films 521A and 522A. Further, provision of the heat sink 540 including the heat release fin 542 on the light-incident side of the cooling device 500 contributes to efficient cooling.

(8) Since the object to be cooled is the polarization films 521A and 522A easily heated by absorbing unnecessary light, the cooling effect can be distinctly shown as compared to the other optical conversion film.

(9) Since the projection 449 is formed on both ends of the side of the base body 448 of the base 445 and the gap as the flow path of the cooling air is formed therebetween, the polarization films 521A and 522A, the fixing member 600 and the light-incident sides of the cross dichroic prism 443 can be directly cooled by sending cooling air to the gap, thereby securely preventing thermal deterioration of the polarization films 521A and 522A and thermal expansion of the fixing member 600.

(10) Since the attachment surface 631 of the fixing member 600 protrudes toward the light-incident side relative to the cooling device attachment surface 449A, the distance between the liquid crystal panel 441 and the attachment surface 631 can be reduced, thus reducing the length of the pin 730. Accordingly, the load applied to the bonding portion of the pin 730 and the attachment surface 631 can be minimized, thereby enhancing durability of the optical device body 48. Further, since the step portion 722 recessed toward the attachment surface 631 is provided on the panel holding frame 720, the length of the pin 730 can be further reduced, thus further enhancing durability and securing sufficient image quality of the combined image by restraining position shift of the liquid crystal panel 441.

(11) Since the irradiation-side polarization plate 520 is composed of two plates, even when the unnecessary light cannot be sufficiently absorbed by the first polarization plate 522, the unnecessary light can be securely converted into a predetermined polarization light by the second polarization plate 521.

(12) Since such optical device body 48 is used for the projector 1, the polarization films 521A and 522A can be sufficiently cooled without increasing the flow rate of the cooling air circulating inside the projector 1 while achieving size reduction, high luminance and low noise of the projector 1.

[Second Embodiment]

Next, a projector according to a second embodiment of the present invention will be described below with reference to attached drawings.

The projector according to the second embodiment differs from the projector 1 of the first embodiment only in the arrangement of the liquid crystal panel as a part of the optical device body 48. Accordingly, the same reference numeral will be attached to the same or corresponding component as the first embodiment to omit or simplify the description thereof.

[2-1 Arrangement of Optical Device Body]

Figure 6:
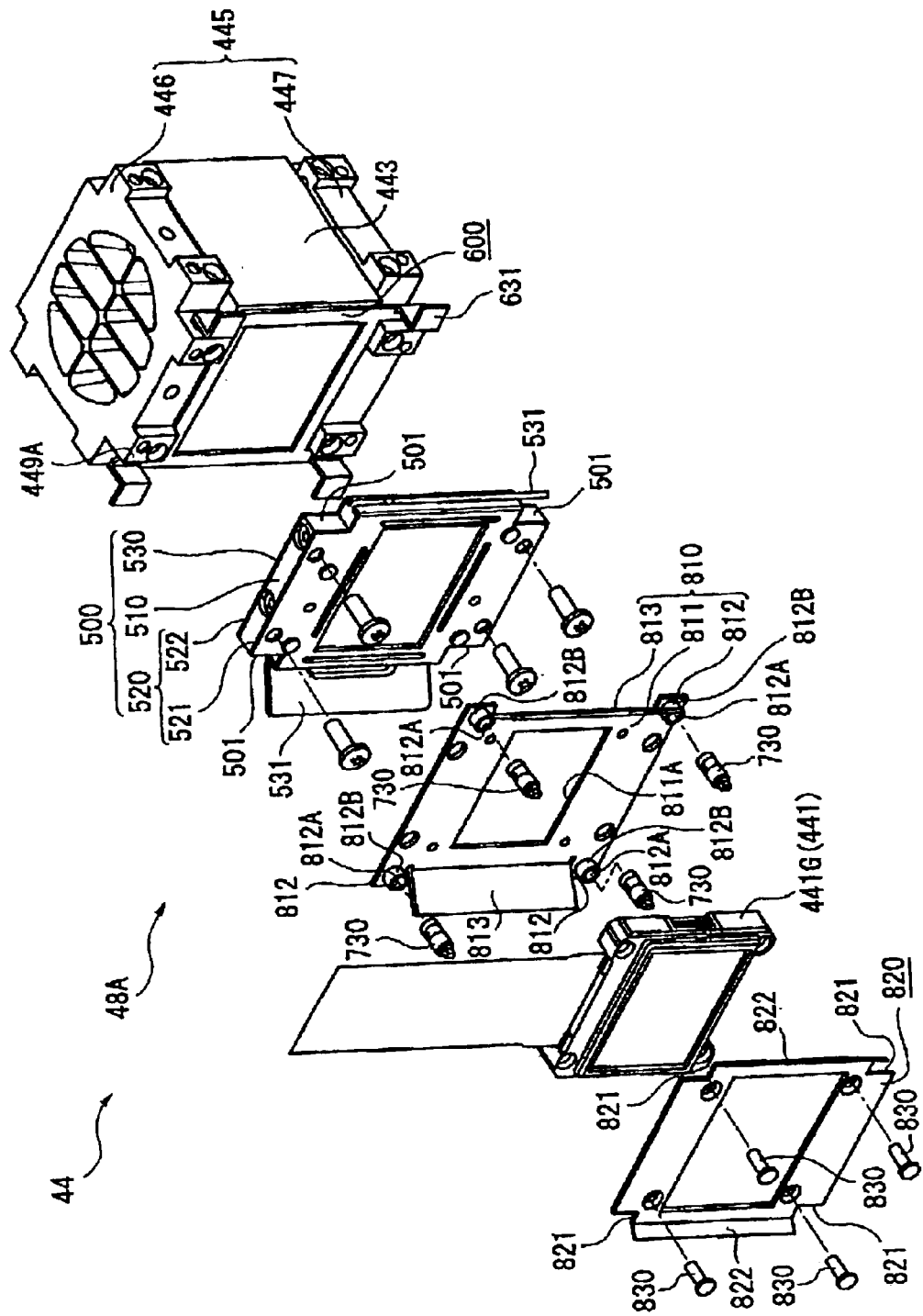
FIG. 6 is an exploded perspective view showing an optical device body according to a second embodiment of the present invention.
Figure 7:
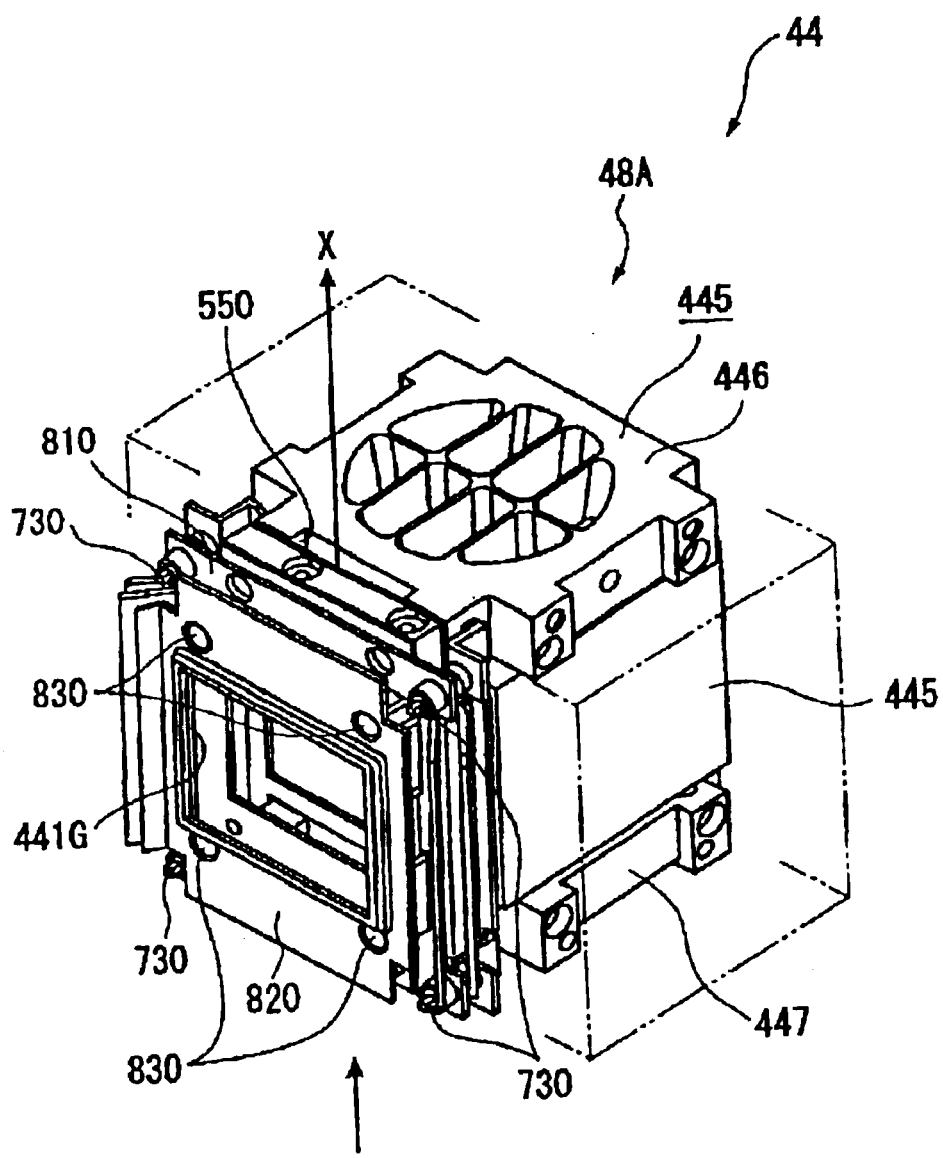
FIG. 7 is a perspective view showing the optical device body of the second embodiment.

FIG. 5 is an exploded perspective view showing an optical device body 48A of the optical device 44. FIG. 6 is a perspective view showing the optical device body 48A. Incidentally, as in the first embodiment, only the liquid crystal panel 441G side will be illustrated as an example and the illustration of the other liquid crystal panels 441R and 441B will be omitted.

As shown in FIG. 5, the optical device body 48A includes the cross dichroic prism 443, the base 445, the cooling device 500, the fixing member 600 which are the same component as the first embodiment, and the liquid crystal panel 441G mounted on the fixing member 600.

The liquid crystal panel 441G of the present embodiment is a liquid crystal panel generally used in the other projector. A holding plate 810 is provided on the light-irradiation side of the liquid crystal panel 441G and a heat sink 820 is provided on the light-incident side thereof.

The holding plate 810 is a plate made of metal such as iron, magnesium, aluminum, titanium and the like for holding the liquid crystal panel 441G, which includes a rectangular holding plate body 811 opposing to the light-incident side of the cooling device 500, an extension 812 extending from the corners of the holding plate body 811 to the lateral side thereof to correspond to the cut 501 of the cooling device 500, and a heat release fin 813 formed on both sides of the holding plate body 811.

The holding plate body 811 is a portion for the light-irradiation side of the liquid crystal panel 441G to be abutted, which is made of metal and works as a heat sink for releasing the heat generated on the liquid crystal panel 441G. A rectangular opening 811A corresponding to the image formation area of the liquid crystal panel 441G is formed at the central portion of the holding plate body 811.

Holes 812A penetrating along the light-incident direction are respectively formed on the four extensions 812. A rising portion 812B, which is the periphery of the hole 812A and projecting in out-plane direction i.e. toward light-incident side, is formed on the respective extensions 812 around the hole 812A.

The heat sink 820 is a plate made of metal such as iron, magnesium, aluminum and titanium to be in contact with the light-incident side of the liquid crystal panel 441G, which releases the heat generated on the liquid crystal panel 441G. A cut 821 corresponding to the rising portion 812B is formed on the corners of the heat sink 820. A beat release fin 822 is formed on both sides of the heat sink 820.

As described above, the liquid crysal panel 441G is sandwiched by the holding plate 810 and the heat sink 820 as shown in FIG. 6, the three components 441G, 810 and 820 being fixed and integrated by screws 830. The integrated components are mounted on the attachment surface 631 of the fixing member 600 attached on the light-incident side of the cross dichroic prism 443 through the pin 730.

Further, as in the first embodiment, as shown by the arrow in FIG. 6, the cooling air introduced into the inside of the light guide 47 is straightened to flow from the lower side of the optical device 44 to the upper side and flows along the wind guide 550 and the front and back sides of the liquid crystal panel 441G to flow toward the upper side of the optical device body 48A while cooling the cooling device 500, the base 445, the liquid crystal panel 441G, the incident-side polarization plate 444 and so on. At this time, the liquid crystal panel 441G is efficiently cooled by the heat release fins 822, and the polarization films 521A and 522A are efficiently cooled by the heat release fins 813 and 531.

[2-2. Advantages of Second Embodiment]

According to the present embodiment, following advantages can be obtained as well as approximately the advantages (1) to (12) of the first embodiment

(13) Since a conventional general liquid crystal panel 441G is used and attached to the holding plate 810, which is bonded on the attachment surface 631 of the fixing member 600 through the pin 730 as before, it is not necessary to newly design a liquid crystal panel 441G, thereby restraining production cost of the optical device body 48.

(14) Since the rising portion 812B is formed on the periphery of the hole 812A on the holding plate 810, sufficient bonding area between the pin 730 and the holding plate 810 can be secured. Accordingly, by coating adhesive on the rising portion 812B having sufficient bonding area, the holding plate 810 provided with the liquid crystal panel 441G can be securely fixed on the fixing member 600.

(15) Since the heat sink 820 having the heat release fin 822 is provided on the light-incident side of the liquid crystal panel 441 and the holding plate 810 having the heat release fin 813 is provided on the light-irradiation side of the liquid crystal panel 441, the liquid crystal panel 441 can be efficiently cooled by blowing cooling air to the heat release fins 822 and 813. Further, since the holding plate 810 having the heat release fin 813 is provided between the liquid crystal panel 441 and the cooling device 500, the liquid crystal panel 441 can be prevented from influenced by the heat generated on the optical conversion films 521A and 522A.

[Third Embodiment]

Next, a projector according to third embodiment of the present invention will be described below.

The projector according to the third embodiment of the present invention differs from the projector 1 of the first embodiment only in the arrangement of a part of the optical device body. Accordingly, the same reference numeral will be attached to the component identical or corresponding to the components of the first embodiment to omit or simplify the description thereof.

Further, the arrangement of the liquid crystal panel 441 of the second embodiment, i.e. the holding plate 810, the liquid crystal panel 441 and the heat sink 820 may be used in the present embodiment.

[3-1. Arrangement of Optical Device Body]

Figure 8:
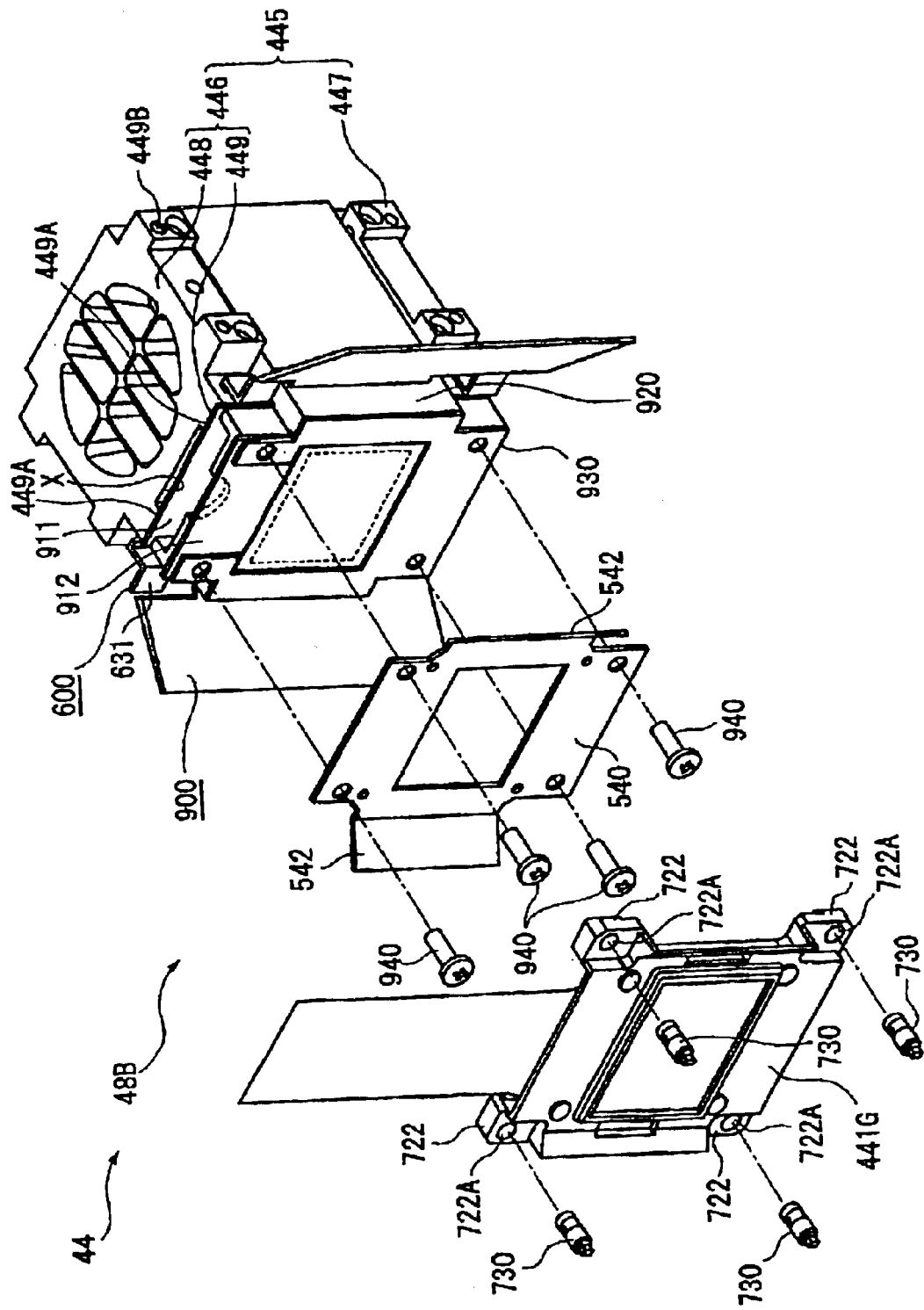
FIG. 8 is an exploded perspective view showing an optical device body according to a third embodiment of the present invention.

FIG. 8 is an exploded perspective view showing the optical device body 48B of the optical device 44. FIG. 9 is a vertical cross sectional view showing the optical device body 48B. Incidentally, as in the first embodiment, only the liquid crystal panel 441 side will be illustrated as an example and the illustration of the other liquid crystal panels 441R and 441B will be omitted in FIG. 8.

As shown in FIG. 8 or 9, the optical device body 48B has the liquid crystal panel 441 (441G), the cross dichroic prism 443, the base 445, the fixing member 600, which are the same as the first embodiment, and a cooling device 900 different from the first embodiment, the cooling device 900 being bonded to the base 445.

Figure 10:
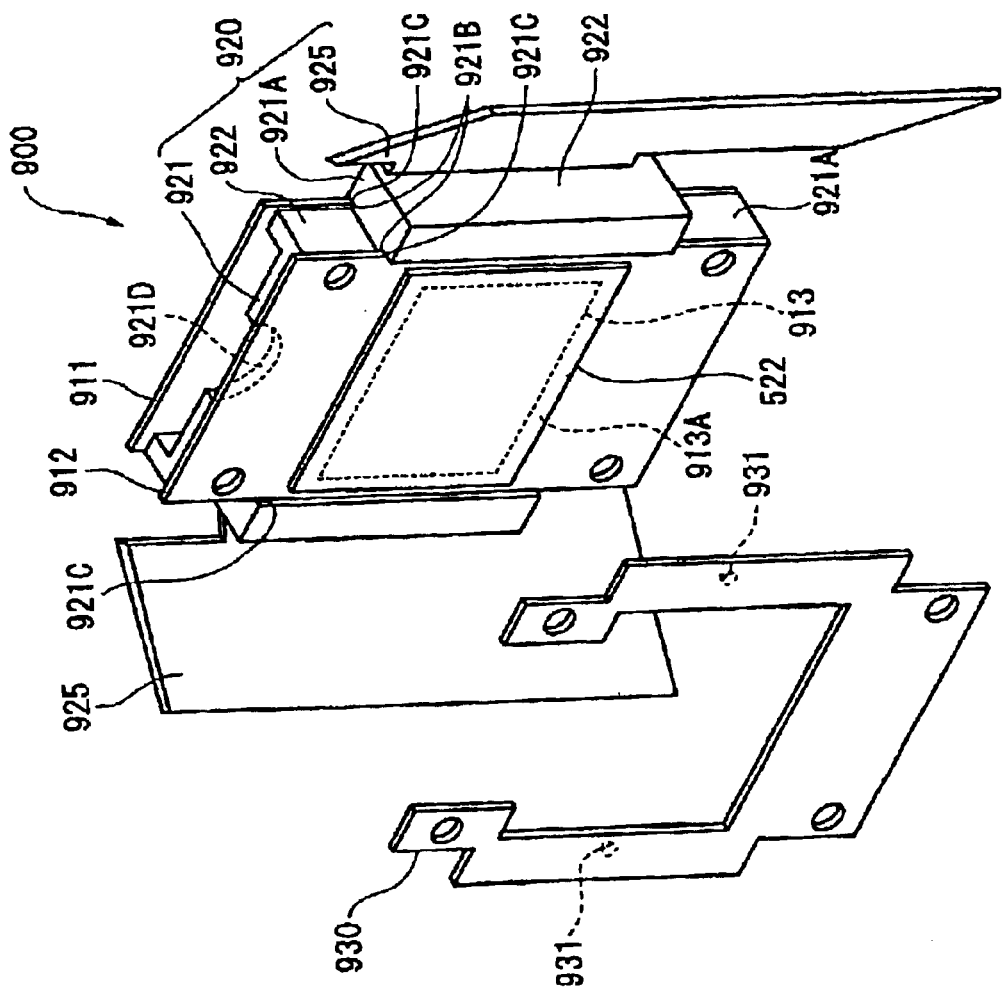
FIG. 10 is an exploded perspective view showing a structure of the cooling device of the third embodiment

FIG. 10 is an exploded perspective view showing the structure of the cooling device 900.

As shown in FIG. 8 or 10, the cooling device 900 has a pair of the polarization plates 521 and 522(FIG. 9), a pair of support plates 911 and 912 to which the respective polarization plates 521 and 522(FIG. 9) are bonded, a metal holder 920 disposed between the pair of support plates 911 and 912, and a pressing plate 930 as a metal pressing member disposed on the light-incident side of the support plate 912 located on the light-incident side, the cooling device 900 cooling the polarization films 521A and 522A (FIG. 9) of the polarization plates 521 and 522.

The pair of support plates 911 and 912 are made of metal such as aluminum, magnesium and have rectangular plate configuration corresponding to the surface defined by the cooling device attachment surface 449A of the four projections 449 of the base 445.

Figure 9A:
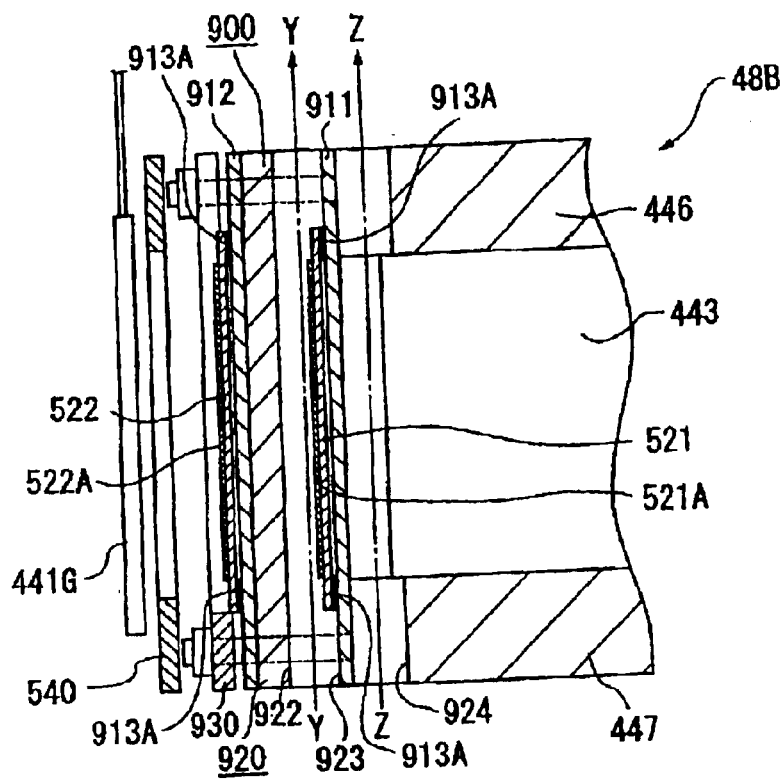
FIGS. 9A & 9B are vertical cross sections showing the optical device body of the third embodiment.

Rectangular opening 913 corresponding to the image formation area of the liquid crystal panel 4410 is formed at the central portion of the support plates 911 and 912. As shown in FIG. 9(A) and FIG. 10, thermally-conductive adhesive 913A such as solder is provided around the opening 913 of the each support plates 911 and 912. The substrate of the polarization plates 521 and 522 are adhered to cover the opening 913 through the thermally-conductive adhesive 913A.

Further, as shown in FIG. 8, the support plates 911 disposed on the light-irradiation side spans over the four cooling device attachment surfaces 449A to be in contact with the cooling device attachment surfaces 449A.

In FIG. 10, the holder 920 has a rectangular holder body 921 having a cut 921A on the corner thereof, a sidewall 922 projecting from both sides of the holder body 921 toward the light-irradiation side, and a heat release fins 925 formed on both lateral sides of outer circumference of the holder 920. The holder 920 is a planarly-viewed C-shaped metal component for holding the pair of support plates 911 and 912 in light-incident and light-irradiation direction while being spaced apart with each other.

A non-illustrated rectangular opening corresponding to the image formation area of the liquid crystal panel 441G is formed at the central portion of the holder body 921. A holding surface 921B having a dimension corresponding to the pair of support plates 911 and 912 and recessed in mutually approaching direction is formed on the opposing sides of the older body 921. The pair of support plates 911 and 912 are abutted to the holding surface 921B to be held.

Since the holding surface 921B is recessed by a step, both sides of the holding surface 921B of the holder body 921 work as a guiding groove 921C for guiding both opposing sides of the support plates 911 and 912. The support plates 911 and 912 are capable of vertical slide movement along the guiding groove 921C to be detachable and attachable relative to the holder 920.

Further, as shown in FIG. 10, a semicircular notch 921D (seen in front direction) is formed at the approximately center of the upper end of the holder body 921. The notch 921D facilitates grasping the support plate by a worker when the light-incident side support plate 912 is detached and attached in vertical direction.

As shown in FIG. 9(A), a vertically-penetrating gap 923 is formed on the holder 920 by the sidewall 922. The gap 923 works as a wind guide for flowing the cooling air Y circulating inside the projector. Incidentally, the cooling air Z circulating in the projector is introduced to a wind guide 924 between the light-incident side of the cross dichroic prism 443 and the support plate 911.

Accordingly, as in the first and second embodiments, the cooling air introduced into the inside of the light guide 47 is straightened to flow from the lower side of the optical device 44 to the upper side and passes through the gap 923 and the wind guide 924 and along the front and back sides of the liquid crystal panel 441G to flow toward the upper side of the optical device body 48B while cooling the cooling device 900, the base 445, the liquid crystal panel 441G, the incident-side polarization plate 444 and so on. At this time, the polarization films 521A and 522A are efficiently cooled by the heat release fins 925 and 542.

As shown in FIG. 10, the pressing plate 930 presses the support plate 912 on the light-incident side toward the holder 920, which opposes to the light-incident side of the holder body 921 and arranged not to shield the polarization plate.

Figure 9B:
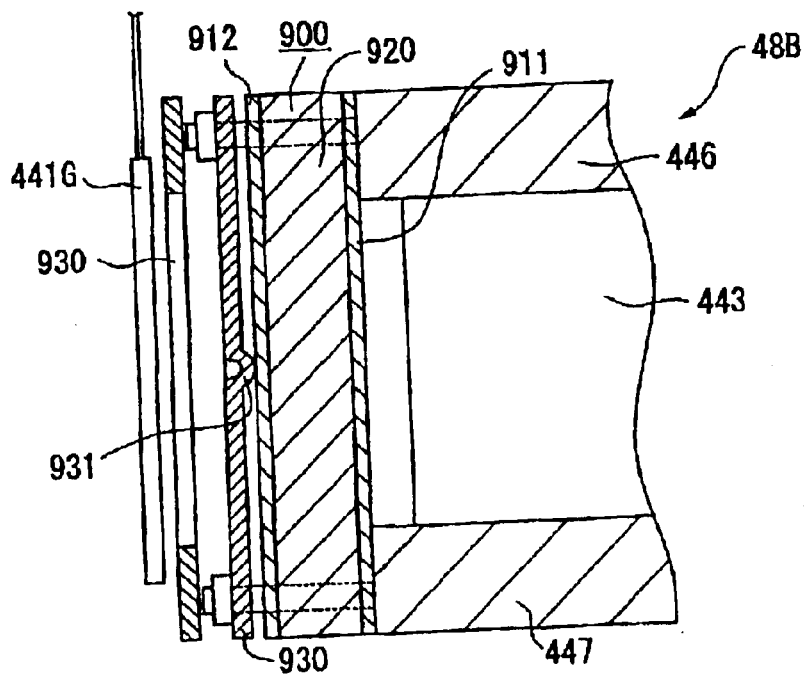

A convex portion 931 formed by sticking out a part of the pressing plate 930 is formed at the central position of the both peripheral sides of the pressing plate as shown in FIGS. 9(B) and 10. The convex portion 931 allows secure contact of the support plate 912 toward the holder 920 for securely abutting the components 911, 912 and 920 with each other, which works as an elastic member having thermal conductivity.

As shown in FIG. 8, a screw 940 is inserted to the holes formed on the components 540 and 900 to be screwed to the screw hole 449B of the projection 449 of the base 445, thus being connected to the cooling device attachment surface 449A. Accordingly, the cooling device 900 is appropriately located and fixed relative to the cross dichroic prism 443.

[3-2. Advantages of Third Embodiment]

According to the present embodiment, following advantages can be obtained as well as approximately the same advantages (1)–(4) and (6) to (15) of the first embodiment.

(16) Since the wind guides 923 and 924 for guiding the cooling air Y and Z are formed on the holder 920, the polarization films 521A and 522A of the two polarization plates 521 and 522 can be further efficiently cooled by introducing the cooling air Y and Z to the wind guides 923 an 924.

(17) Since the heat release fins 925 are formed on both sides of the cooling device 900, conduction of the heat generated on the polarization films 521A and 522A to the cooling device 900 can be accelerated by blowing cooling air to the heat release fin 925, thus further efficiently cooling the polarization films 521A and 522A. Further, provision of the heat sink 540 including the heat release fin 542 on the light-incident side of the cooling device 900 contributes to efficient cooling.

(18) Since the guiding groove 921C is formed on the holder 920 so that the support plates 911 and 912 can be vertically attached and detached, only the support plates 911 and 912 including the polarization plates 521 and 522 can be easily exchanged without changing the attitude of the liquid crystal panel 441 only by detaching the screw 940 even after the optical device body 48 is assembled, thus facilitating assembly and repair work.

(19) Since the pressing plate 930 is provided, the support plates 911 and 912 and holder 920 etc. can be securely fixed to the base 445 to prevent position shift. Further, since the pressing plate 930 is made of thermally-conductive member, the heat generated on the polarization films 521A and 522A can be transferred to the pressing plate 930, thus improving cooling efficiency.

(20) Since the support plate 912 is pressed toward the holder 920 by the convex portion 931 having elasticity formed by punching the pressing plate 930, the support plate 912 and holder 920 can be closely attached even when there is some error in the outer profile of the support plate 912 and the holder 920, so that the heat generated on the polarization films 521A and 522A can be securely transferred to the holder 920.

[4. Modifications]

Incidentally, the scope of the present invention is not restricted to the above embodiments, but includes other arrangements as long as an object of the present invention can be achieved, which include following modifications.

Though the polarization films 521A and 522A are cooled in the above embodiments, other arrangement is possible in which other optical conversion film such as optical compensating film, anti-reflection film and phase film is cooled. The number of the polarization film may not be two, but may be one or more than two.

Though the base 445 is provided on the upper and lower sides of the cross dichroic prism 443 in the above embodiments, the base 445 may be provided only on one side. In other words, any arrangement is possible as long as the cross dichroic prism 443 can be fixed and the cooling device 500 can be attached.

Though the position of the attachment surface 631 of the fixing member 600 is located on the light-incident side of the cooling device attachment surface 449A of the base 445 in the above embodiments, but not limited to this, the position of the attachment surface may be flush with the cooling device attachment surface 449A or may be located on the light-irradiation side. There is no limitation on the spatial relationship between the cooling device attachment surface 449A and the attachment surface 631.

Though the cooling devices 500 and 900 and the base 445 are attached on four locations, the cooling device 500 and the base 445 may be connected on less or more than four locations.

Though the corner of the cooling devices 500 and 900 is cut so as not to block the pin 730 in the above embodiments, such arrangement is not limiting but both lateral peripheries of the cooling devices 500 and 900 may be cut to form a thin cooling device, for instance. In other words, the cooling devices 500 and 900 may be designed in any manner as long as the pin 730 is not blocked.

Though the corner of the panel holding frame 720 is arranged as a recessed step portion 722 in the first embodiments, the step portion 722 may not be formed considering trouble in production process.

Though the polarization plates 521 and 522 and the support plates 911 and 912 are bonded by soldering in the third embodiment, the polarization plates and the support plates may be bonded using plating or metal vacuum evaporation of nickel-phosphorus, gold-phosphorus, gold-chromium, silver-chromium, gold-manganese-molybdenum etc.

Though a projector having three optical modulators are described as an example in the respective embodiments, but limited to this, the projector may have only one optical modulator, two optical modulators, or more than three optical modulators.

Though the liquid crystal panel is used as the optical modulator in the above embodiments, an optical modulator other than liquid crystal such as a device using a micromirror may be used. Though transmissive optical modulator is used in the embodiments, reflective optical modulator may be used.

Though a front-type projector where the image is projected from a screen-observing direction is described as an example in the above embodiments, the present invention may be applied to a rear-type projector for projecting an image from a direction opposite to the screen-observing direction.

Specific construction and configuration may be designed in any manner as long as an object of the present invention can be achieved.

The expansion coefficient of the material of the components used in the above embodiments will be described below:

Cross dichroic prism 443 (glass BK7): $0.72*10^{-5}$

Fixing member 600 (steel): $1.12*10^{-5}$

Panel holding face 720, holder 810: Magnesium (Mg); $2.60*10^{-5}$

Aluminum (Al): $2.18*10^{-5}$

Since the fixing member 600 is made of steel having approximately intermediate expansion coefficient of the cross dichroic prism 443 (glass) and the panel holding frame 720 and the holder 810 (magnesium or aluminum), picture element shift caused by difference in temperature can be reduced.

The entire disclosures of Japanese Patent Application Nos. 2002-178705 and 2003-164858 respectively filed on Jun. 19, 2002 and Jun. 10, 2003 including specification, claims, drawings and summary are incorporated herein by reference in the entirety thereof.

What is claimed is:

1. An optical device, comprising:
   a plurality of optical modulators that respectively modulate a plurality of color lights in accordance with image information;
   a color combining optical device that has a plurality of light-incident sides opposing to the respective optical modulators and combines the color lights modulated by the optical modulators;
   an optical converter interposed between the optical modulator and the light-incident side and having an optical conversion film on a substrate, the optical conversion film optically converting the color light irradiated by the optical modulator;
   a cooling device having a holding surface on which the optical converter is held, the cooling device being made of a thermally-conductive material and cooling the optical converter;
   a base provided on a side intersecting the light-incident side of the color combining optical device, the base having a cooling device attachment surface on which the cooling device is attached; and
   a fixing member attached on the light-incident side which locates and fixes the optical modulator on the light-incident side of the color combining optical device, the fixing member having a attachment surface on which an attachment member for attaching the optical modulator is attached.

2. The optical device according to claim 1, wherein the attachment surface of the fixing member protrudes in a light-incident direction relative to the cooling device attachment surface of the base, and wherein a cut corresponding to the attachment surface of the fixing member is formed on the cooling device.

3. The optical device according to claim 1, the base further comprising:

a plate-shaped base body fixed on a side intersecting the light-incident side; and a projection projecting from both lateral sides of the base body toward the light-incident side, the projection having the cooling device attachment surface on the distal side thereof.

4. The optical device according to claim 1, wherein a stress relief that relieves a stress caused by a difference in thermal expansion coefficient of the material of the fixing member and the material of the color combining optical device is provided on the fixing member.

5. The optical device according to claim 1, wherein the base is provided respectively on a pair of sides intersecting the light-incident side of the color combining optical device, and wherein the cooling device is attached spanning over the cooling device attachment surfaces of the pair of bases.

6. The optical device according to claim 1, wherein the optical converter includes no less than two optical conversion elements, wherein the cooling device has a holding surface that spaces apart the no less than two optical conversion elements in a light-incident direction, and wherein the space between the no less than two optical conversion elements is a cooling chamber for a coolant to be sealed in.

7. The optical device according to claim 1, wherein the optical converter includes no less than two optical conversion elements, wherein the cooling device has a plurality of support plates for the respective optical conversion elements to be fixed through a thermally-conductive material and a holder having a holding surface that spaces apart the plurality of support plates in a light-incident direction, and wherein the holder has a wind guide that introduces a cooling air.

8. The optical device according to claim 7, wherein the holder has a guiding groove that guides opposing sides of the support plate, and wherein the plurality of support plates are attachable to and detachable from the holding surface along an extending direction of the opposing sides.

9. The optical device according to claim 7, wherein the cooling device is disposed on a light-incident side of one of the plurality of the support plates located most adjacent to the light-incident side and has a pressing member that presses the support plate located most adjacent to the light-incident side toward the holder.

10. The optical device according to claim 9, wherein the pressing member is provided with a thermally-conductive elastic member that biases the support plate located most adjacent to the light-incident side toward the holder.

11. The optical device according to claim 1, wherein the substrate is made of a material selected from a group consisting of sapphire glass, crystal and silica glass.

12. The optical device according to claim 1, wherein the base and/or the cooling device is made of metal.

13. The optical device according to claim 1, further comprising a heat release fin on an outer circumference of the cooling device.

14. The optical device according to claim 1, wherein the optical conversion film is a polarization film.

15. An optical device, comprising:

a plurality of optical modulators that respectively modulate a plurality of color lights in accordance with image information;

a color combining optical device that has a plurality of light-incident sides opposing to the respective optical modulators and combines the color lights modulated by the optical modulators;

an optical converter interposed between the optical modulator and the light-incident side and having an optical conversion film on a substrate, the optical conversion film optically converting the color light irradiated by the optical modulator;

a cooling device having a holding surface on which the optical modulator is held, the cooling device being made of a thermally-conductive material and cooling the optical converter;

a base provided on a side intersecting the light-incident side of the color combining optical device, the base having a cooling device attachment surface on which the cooling device is attached; and a fixing member attached on the light-incident side which locates and fixes the optical modulator on the light-incident side of the color combining optical device, the fixing member having a attachment surface on which an attachment member for attaching the optical modulator is attached, the base being provided respectively on a pair of sides intersecting the light-incident side of the color combining optical device, the cooling device being attached spanning over the cooling device attachment surfaces of the pair of bases, the optical modulator being a rectangular plate having an optical modulator body and a holding frame that holds the optical modulator body, a hole penetrating along a light-incident direction being formed on a corner of the holding frame, the attachment member being a pin inserted to the hole, an end of the pin being attached on the attachment surface of the fixing member.

16. The optical device according to claim 15, wherein the corner having the hole is recessed toward the attachment surface of the fixing member relative to a light-irradiation side of the optical modulator body.

17. The optical device according to claim 15, wherein the optical converter includes no less than two optical conversion elements, wherein the cooling device has a holding surface that spaces apart the no less than two optical conversion elements in a light-incident direction, and wherein the space between the no less than two optical conversion elements is a cooling chamber for a coolant to be sealed in.

18. The optical device according to claim 15, wherein the optical converter includes no less than two optical conversion elements, wherein the cooling device has a plurality of support plates for the respective optical conversion elements to be fixed through a thermally-conductive material and a holder having a holding surface that spaces apart the plurality of support plates in a light-incident direction, and wherein the holder has a wind guide that introduces a cooling air.

19. An optical device, comprising:

a plurality of optical modulators that respectively modulate a plurality of color lights in accordance with image information;

a color combining optical device that has a plurality of light-incident sides opposing to the respective optical modulators and combines the color lights modulated by the optical modulators;

an optical converter interposed between the optical modulator and the light-incident side and having an optical conversion film on a substrate, the optical conversion film optically converting the color light irradiated by the optical modulator;

a cooling device having a holding surface on which the optical modulator is held, the cooling device being made of a thermally-conductive material and cooling the optical converter;

a base provided on a side intersecting the light-incident side of the color combining optical device, the base having a cooling device attachment surface on which the cooling device is attached; and a fixing member attached on the light-incident side which locates and fixes the optical modulator on the light-incident side of the color combining optical device, the fixing member having a attachment surface on which an attachment member for attaching the optical modulator is attached, the base being provided respectively on a pair of sides intersecting the light-incident side of the color combining optical device, the cooling device being attached spanning over the cooling device attachment surfaces of the pair of bases, a holding plate that holds the optical modulator being attached on the light irradiation side of the optical modulator, a hole penetrating along a light-incident direction being formed on a corner of the holding frame, the attachment member being a pin inserted to the hole, an end of the pin being attached on the attachment surface of the fixing member.

20. The optical device according to claim 19, wherein a rising portion is formed at the periphery of the hole of the holding plate, the rising portion being raised in an out-plane direction.

21. The optical device according to claim 19, wherein the optical converter includes no less than two optical conversion elements, wherein the cooling device has a holding surface that spaces apart the no less than two optical conversion elements in a light-incident direction, and wherein the space between the no less than two optical conversion elements is a cooling chamber for a coolant to be sealed in.

22. The optical device according to claim 19, wherein the optical converter includes no less than two optical conversion elements, wherein the cooling device has a plurality of support plates for the respective optical conversion elements to be fixed through a thermally-conductive material and a holder having a holding surface that spaces apart the plurality of support plates in a light-incident direction, and wherein the holder has a wind guide that introduces a cooling air.

23. A projector comprising an optical device, the optical device having:

a plurality of optical modulators that respectively modulate a plurality of color lights in accordance with image information;

a color combining optical device that has a plurality of light-incident sides opposing to the respective optical modulators and combines the color lights modulated by the optical modulators;

an optical converter interposed between the optical modulator and the light-incident side and having an optical conversion film on a substrate, the optical conversion film optically converting the color light irradiated by the optical modulator, a cooling device having a holding surface on which the optical modulator is held, the cooling device being made of a thermally-conductive material and cooling the optical converter;

a base provided on a side intersecting the light-incident side of the color combining optical device, the base having a cooling device attachment surface on which the cooling device is attached; and a fixing member attached on the light-incident side which locates and fixes the optical modulator on the light-incident side of the color combining optical device, the fixing member having a attachment surface on which an attachment member for attaching the optical modulator is attached.

24. The projector according to claim 23, wherein the attachment surface of the fixing member protrudes in a light-incident direction relative to the cooling device attachment surface of the base, and wherein a cut corresponding to the attachment surface of the fixing member is formed on the cooling device.

25. The projector according to claim 23, the base further comprising:

a plate-shaped base body fixed on a side intersecting the light-incident side; and a projection projecting from both lateral sides of the base body toward the light-incident side, the projection having the cooling device attachment surface on the distal side thereof.

26. The projector according to claim 23, wherein a stress relief that relieves a stress caused by a difference in thermal expansion coefficient of the material of the fixing member and the material of the color combining optical device is provided on the fixing member.

27. The projector according to claim 23, wherein the base is provided respectively on a pair of sides intersecting the light-incident side of the color combining optical device, and wherein the cooling device is attached spanning over the cooling device attachment surfaces of the pair of bases.

28. The projector according to claim 23, wherein the optical converter includes no less than two optical conversion elements, wherein the cooling device has a holding surface that spaces apart the no less than two optical conversion elements in a light-incident direction, and wherein the space between the no less than two optical conversion elements is a cooling chamber for a coolant to be sealed in.

29. The projector according to claim 23,
wherein the optical converter includes no less than two optical conversion elements,
wherein the cooling device has a plurality of support plates for the respective optical conversion elements to be fixed through a thermally-conductive material and a holder having a holding surface that spaces apart the plurality of support plates in a light-incident direction, and
wherein the holder has a wind guide that introduces a cooling air.

30. The projector according to claim 29,
wherein the holder has a guiding groove that guides opposing sides of the support plate, and
wherein the plurality of support plates are attachable to and detachable from the holding surface along an extending direction of the opposing sides.

31. The projector according to claim 29, wherein the cooling device is disposed on a light-incident side of one of the plurality of the support plates located most adjacent to the light-incident side and has a pressing member that presses the support plate located most adjacent to the light-incident side toward the holder.

32. The projector according to claim 31, wherein the pressing member is provided with a thermally-conductive elastic member that biases the support plate located most adjacent to the light-incident side toward the holder.

33. The projector according to claim 23, wherein the substrate is made of a material selected from a group consisting of sapphire glass, crystal and silica glass.

34. The projector according to claim 23, wherein the base and/or the cooling device is made of metal.

35. The projector according to claim 23, further comprising a heat release fin on an outer circumference of the cooling device.

36. The projector according to claim 23, wherein the optical conversion film is a polarization film.

37. A projector having an optical device, the optical device comprising:
a plurality of optical modulators that respectively modulate a plurality of color lights in accordance with image information;
a color combining optical device that has a plurality of light-incident sides opposing to the respective optical modulators and combines the color lights modulated by the optical modulators;
an optical converter interposed between the optical modulator and the light-incident side and having an optical conversion film on a substrate, the optical conversion film optically converting the color light irradiated by the optical modulator;
a cooling device having a holding surface on which the optical modulator is held, the cooling device being made of a thermally-conductive material and cooling the optical converter;
a base provided on a side intersecting the light-incident side of the color combining optical device, the base having a cooling device attachment surface on which the cooling device is attached; and
a fixing member attached on the light-incident side which locates and fixes the optical modulator on the light-incident side of the color combining optical device, the fixing member having a attachment surface on which an attachment member for attaching the optical modulator is attached,
the base being provided respectively on a pair of sides intersecting the light-incident side of the color combining optical device,
the cooling device being attached spanning over the cooling device attachment surfaces of the pair of bases,
the optical modulator being a rectangular plate having an optical modulator body and a holding frame that holds the optical modulator body,
a hole penetrating along a light-incident direction being formed on a corner of the holding frame,
the attachment member being a pin inserted to the hole, an end of the pin being attached on the attachment surface of the fixing member.

38. The projector according to claim 37, wherein the corner having the hole is recessed toward the attachment surface of the fixing member relative to a light-irradiation side of the optical modulator body.

39. The optical device according to claim 37, wherein the optical converter includes no less than two optical conversion elements,
wherein the cooling device has a holding surface that spaces apart the no less than two optical conversion elements in a light-incident direction, and
wherein the space between the no less than two optical conversion elements is a cooling chamber for a coolant to be sealed in.

40. The projector according to claim 37,
wherein the optical converter includes no less than two optical conversion elements,
wherein the cooling device has a plurality of support plates for the respective optical conversion elements to be fixed through a thermally-conductive material and a holder having a holding surface that spaces apart the plurality of support plates in a light-incident direction, and
wherein the holder has a wind guide that introduces a cooling air.

41. A projector having an optical device, the optical device comprising:
a plurality of optical modulators that respectively modulate a plurality of color lights in accordance with image information;
a color combining optical device that has a plurality of light-incident sides opposing to the respective optical modulators and combines the color lights modulated by the optical modulators;
an optical converter interposed between the optical modulator and the light-incident side and having an optical conversion film on a substrate, the optical conversion film optically converting the color light irradiated by the optical modulator;
a cooling device having a holding surface on which the optical modulator is held, the cooling device being made of a thermally-conductive material and cooling the optical converter;
a base provided on a side intersecting the light-incident side of the color combining optical device, the base having a cooling device attachment surface on which the cooling device is attached; and
a fixing member attached on the light-incident side which locates and fixes the optical modulator on the light-incident side of the color combining optical device, the fixing member having a attachment surface on which an attachment member for attaching the optical modulator is attached, the base being provided respectively on a pair of sides intersecting the light-incident side of the color combining optical device, the cooling device being attached spanning over the cooling device attachment surfaces of the pair of bases, a holding plate that holds the optical modulator being attached on the light irradiation side of the optical modulator, a hole penetrating along a light-incident direction being formed on a corner of the holding frame, the attachment member being a pin inserted to the hole, an end of the pin being attached on the attachment surface of the fixing member.

42. The projector according to claim 41, wherein a rising portion is formed at the periphery of the hole of the holding plate, the rising portion being raised in an out-plane direction.

43. The projector according to claim 41, wherein the optical converter includes no less than two optical conversion elements, wherein the cooling device has a holding surface that spaces apart the no less than two optical conversion elements in a light-incident direction, and wherein the space between the no less than two optical conversion elements is a cooling chamber for a coolant to be sealed in.

44. The projector according to claim 41, wherein the optical converter includes no less than two optical conversion elements, wherein the cooling device has a plurality of support plates for the respective optical conversion elements to be fixed through a thermally-conductive material and a holder having a holding surface that spaces apart the plurality of support plates in a light-incident direction, and wherein the holder has a wind guide that introduces a cooling air.

* * * * *